United States Patent
Dibdin et al.

(10) Patent No.: US 7,665,788 B2
(45) Date of Patent: Feb. 23, 2010

(54) VEHICLES AND TRAILERS INCORPORATING MOVEABLE LOAD CARRYING PLATFORMS

(75) Inventors: Peter Dibdin, Scunthorpe (GB); Pauline Dawes, Near Brigg (GB)

(73) Assignee: Middlegate Marketing Ltd. (GB)

( * ) Notice: Subject to any disclaimer, the term of this patent is extended or adjusted under 35 U.S.C. 154(b) by 548 days.

(21) Appl. No.: 10/545,636

(22) PCT Filed: Feb. 16, 2004

(86) PCT No.: PCT/GB2004/000602

§ 371 (c)(1),
(2), (4) Date: Apr. 25, 2006

(87) PCT Pub. No.: WO2004/071806

PCT Pub. Date: Aug. 26, 2004

(65) Prior Publication Data

US 2007/0274799 A1    Nov. 29, 2007

(30) Foreign Application Priority Data

Feb. 15, 2003 (GB) ................. 0303502.9
Mar. 15, 2003 (GB) ................. 0305984.7

(51) Int. Cl.
*B62D 25/20* (2006.01)
(52) U.S. Cl. ....................................... 296/25
(58) Field of Classification Search .............. 410/24, 410/25, 26, 27, 28, 28.1; 414/267, 373, 495, 414/502, 540, 679
See application file for complete search history.

(56) References Cited

U.S. PATENT DOCUMENTS

| | | | |
|---|---|---|---|
| 3,841,503 | A | 10/1974 | Hollenbach |
| 4,642,018 | A | 2/1987 | Leroux et al. |
| 4,898,509 | A | 2/1990 | Thunnissen |
| 4,943,204 | A | 7/1990 | Ehrlich |
| 5,092,721 | A | 3/1992 | Prince |
| 5,915,913 | A | 6/1999 | Greenlaw et al. |

(Continued)

FOREIGN PATENT DOCUMENTS

EP    0611245    8/1994

(Continued)

OTHER PUBLICATIONS

Search Report dated Aug. 13, 2003, Application No. GB 0303502.9.

(Continued)

*Primary Examiner*—H Gutman
(74) *Attorney, Agent, or Firm*—Barnes & Thornburg LLP

(57) ABSTRACT

A trailer is described, defining a floor extending from a first end, and comprising at least one first displaceable platform onto which goods can be loaded from the first end of the trailer. The first platform is supported such that it can be elevated when loaded and advanced away from the first end of the trailer when loaded. The first platform is preferably rolled forwards onto support tracks provided on the sidewalls of the trailer. The trailer may also include a load-carrying well with its own moveable cargo platform or platforms, and the first platform is loaded and moved up and over the well, thereby increasing the capacity of the trailer. Corresponding cargo-carrying vehicles, and loading methods are described and claimed.

39 Claims, 32 Drawing Sheets

U.S. PATENT DOCUMENTS

2003/0133774 A1    7/2003    Dibdin et al.

FOREIGN PATENT DOCUMENTS

| EP | 0893302 | 1/1999 |
|---|---|---|
| GB | 1237365 | 6/1971 |
| GB | 1499159 | 1/1978 |
| GB | 2215699 | 9/1989 |
| GB | 2279917 | 1/1995 |
| GB | 2325894 | 9/1998 |
| GB | 2325914 | 9/1998 |
| JP | 8-500789 | 1/1996 |
| JP | 11-227514 | 8/1999 |
| JP | 2002-274244 | 9/2002 |
| JP | 2002-362213 | 12/2002 |
| WO | WO 94/02337 | 2/1994 |
| WO | WO 01/62542 | * 8/2001 |

OTHER PUBLICATIONS

Search Report dated Aug. 25, 1998, Application No. GB 9711607.3.
Search Report dated Sep. 30, 1998, Application No. GB 9702229.7.
PCT International Search Report for PCT/GB2004/000602 by the European Searching Authority on Sep. 10, 2004.
Office Action for counterpart Japanese Patent Application No. 2006-502280 mailed Apr. 14, 2009 (English and Japanese language versions).

* cited by examiner

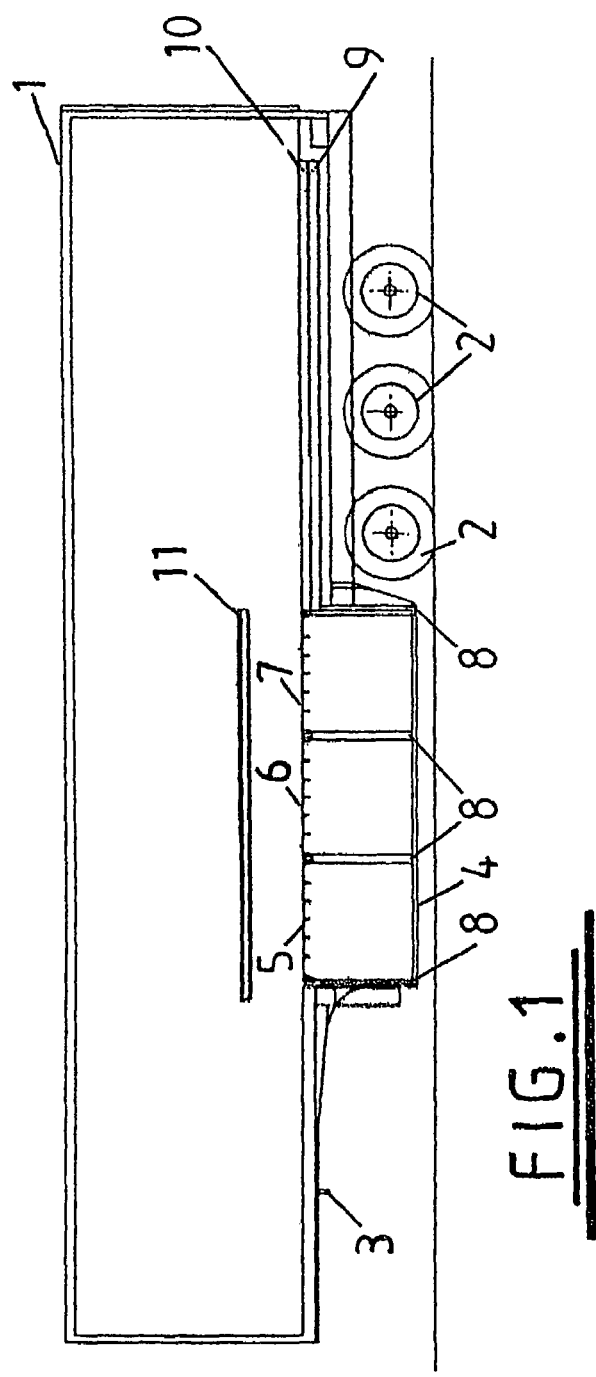
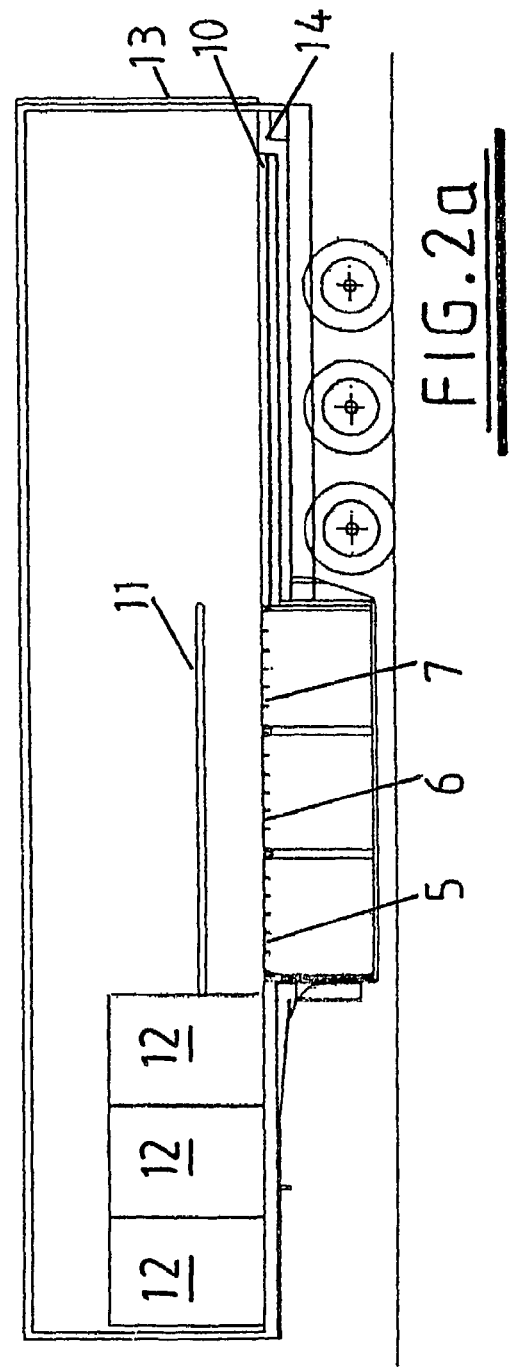

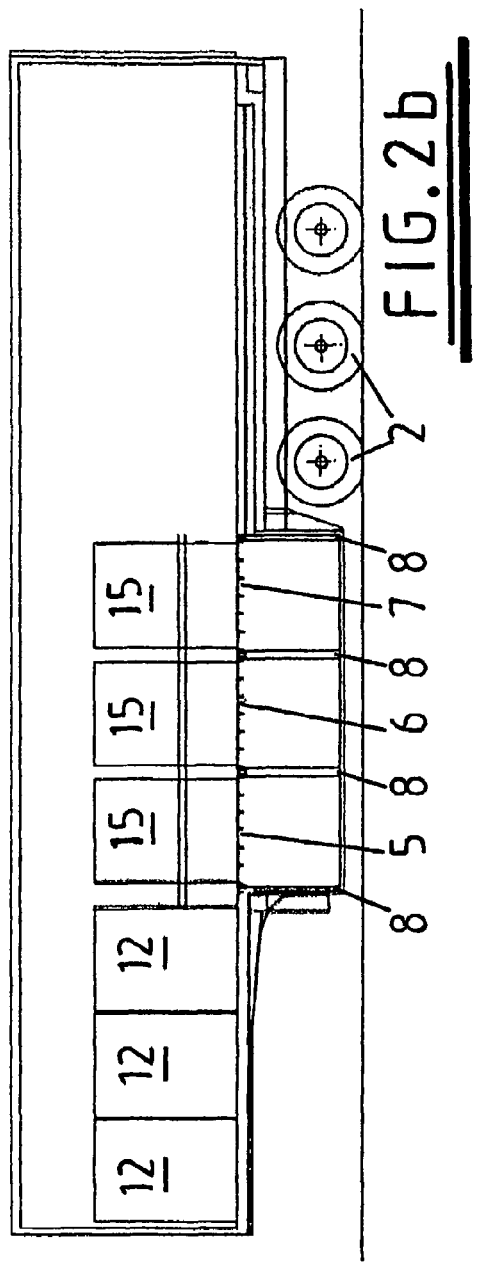
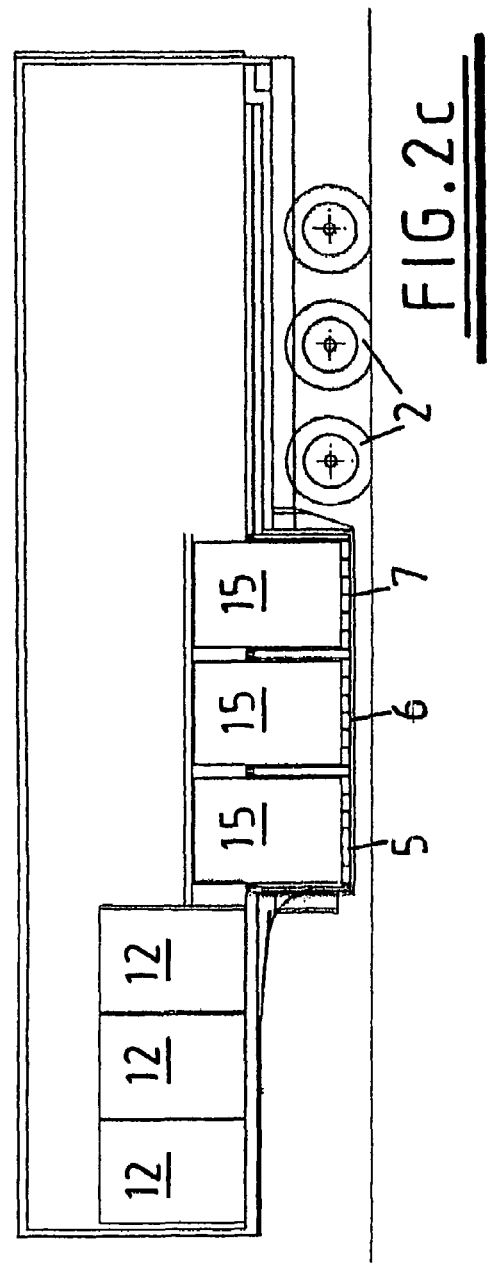

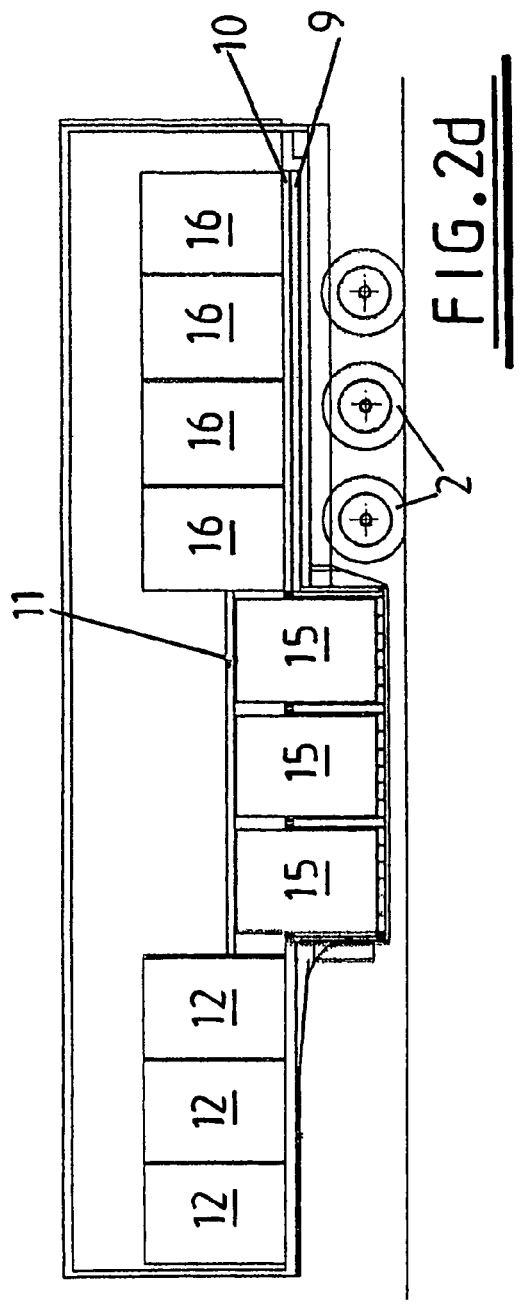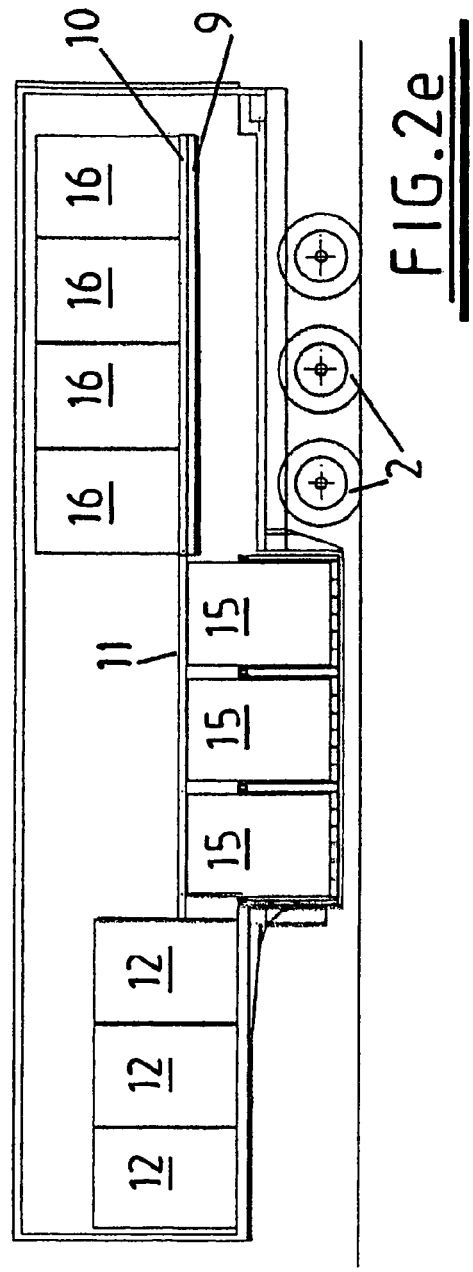

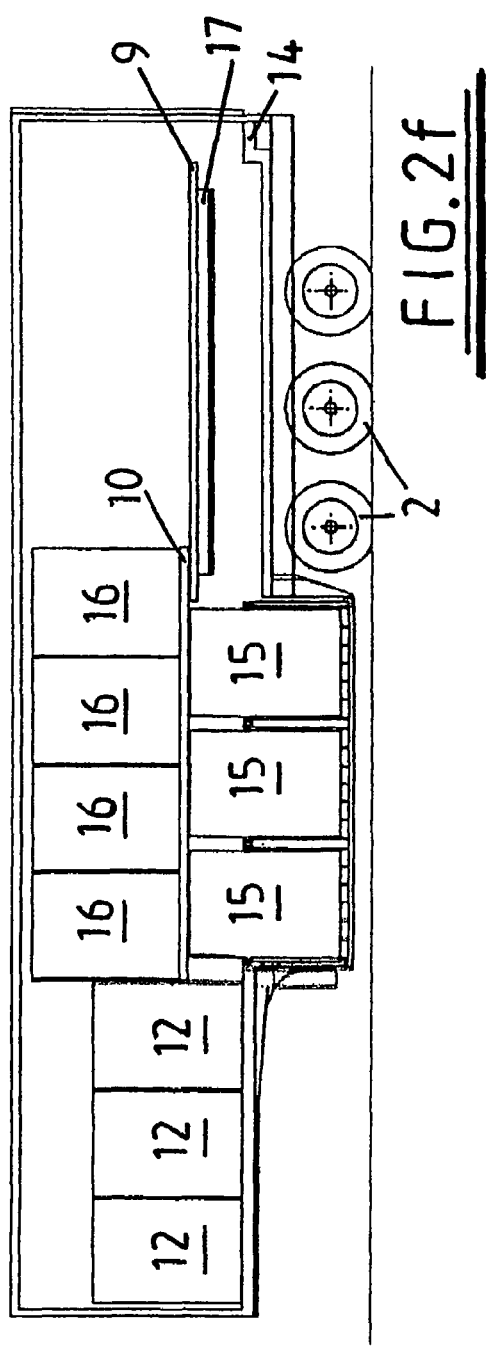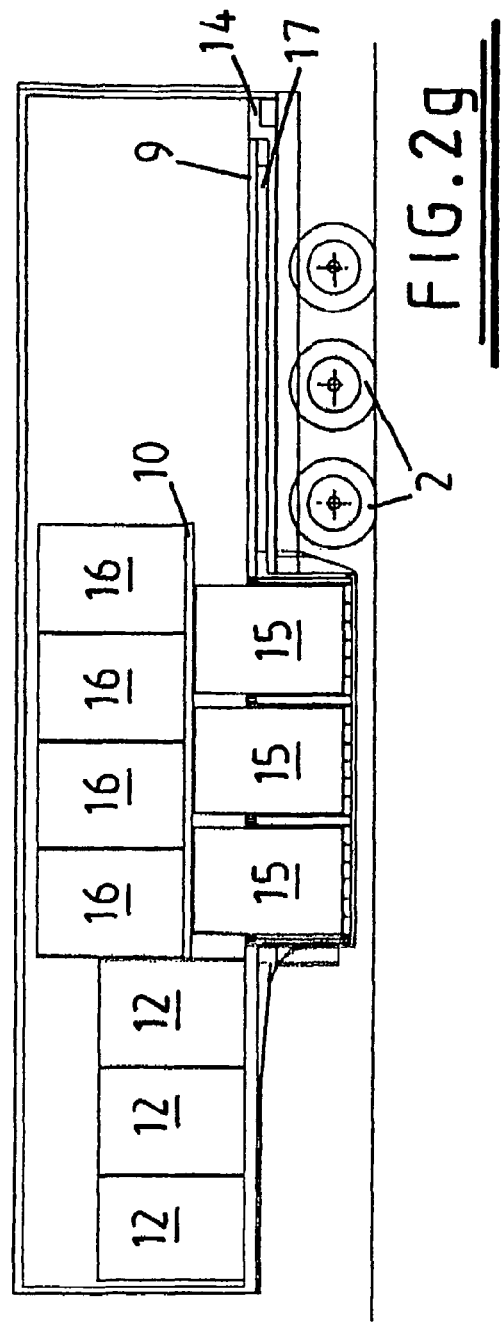

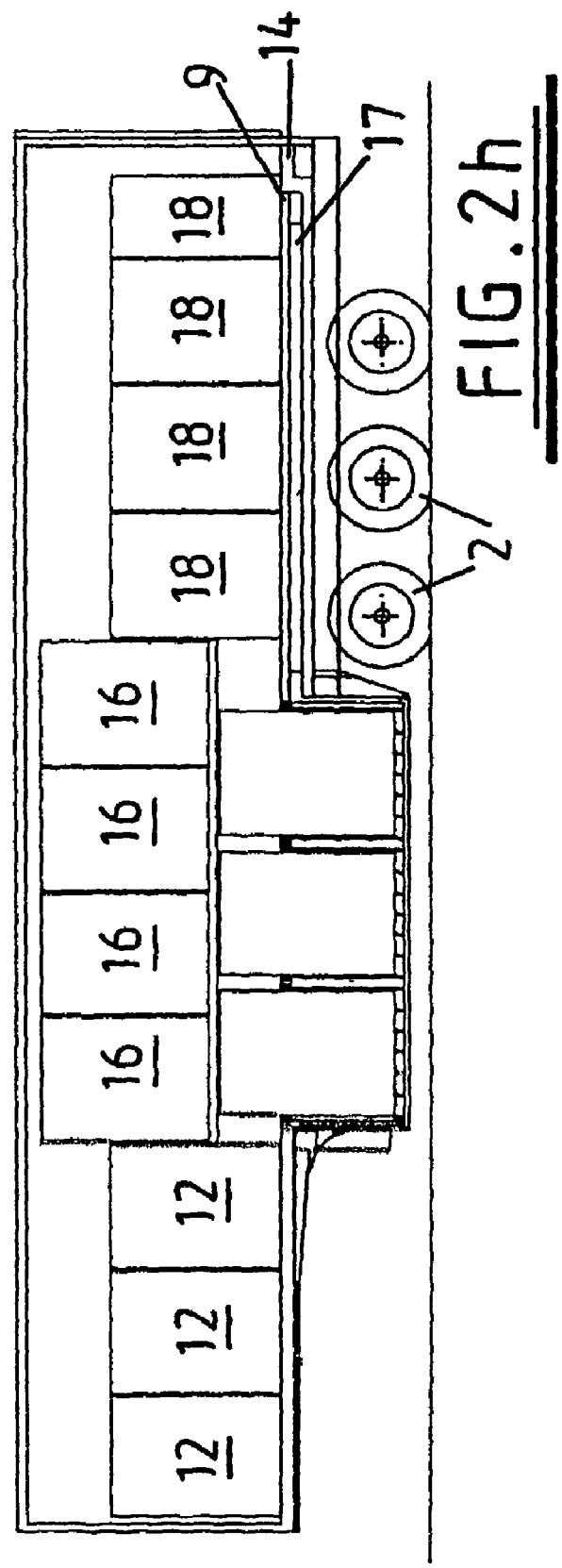

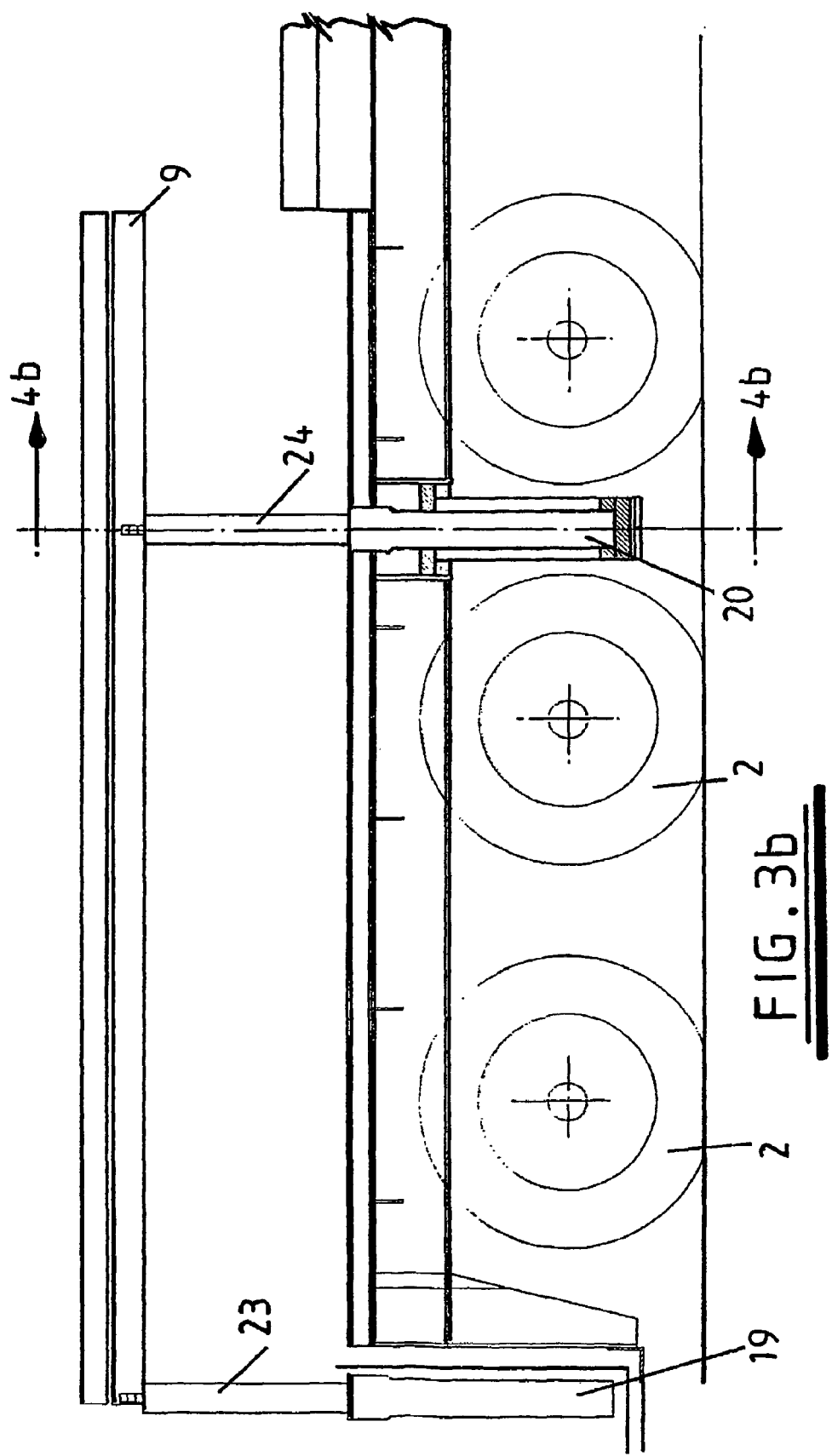

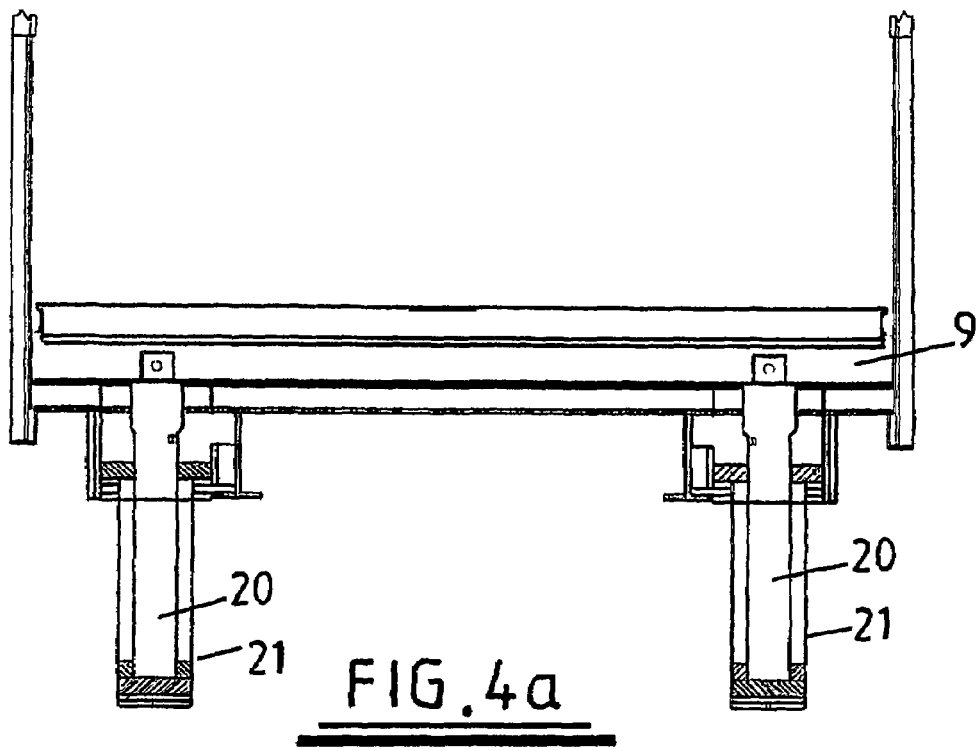
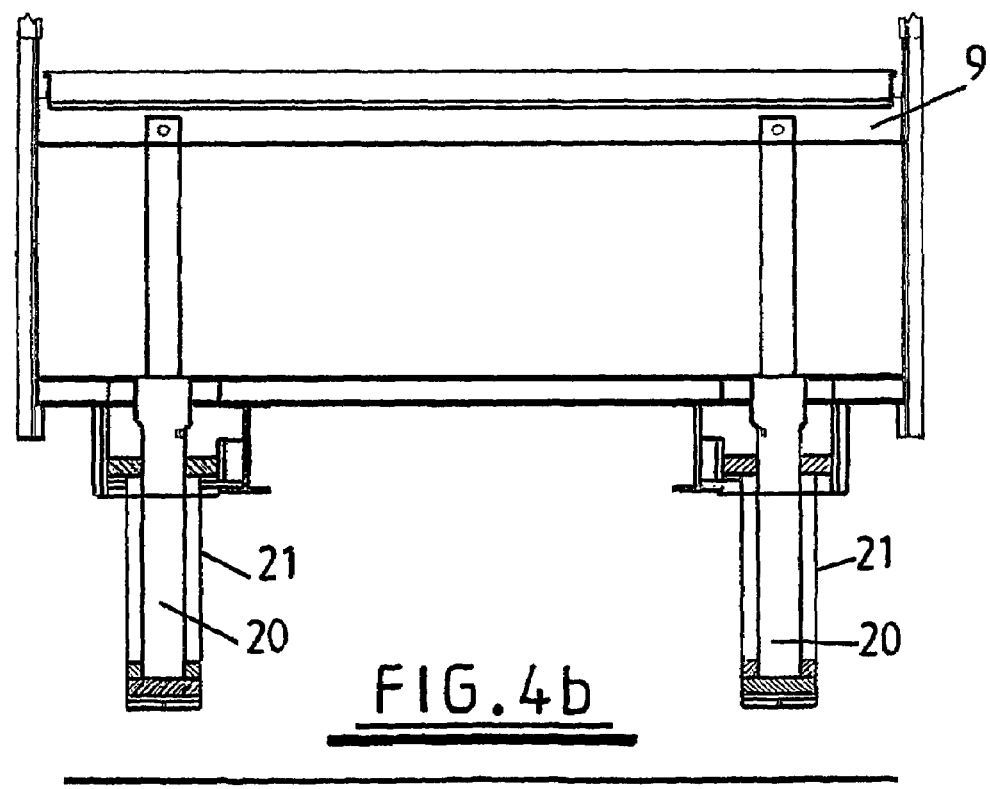

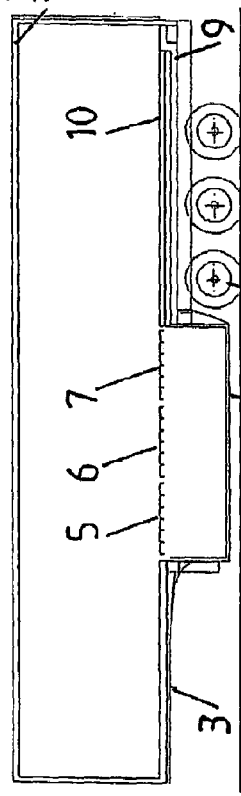
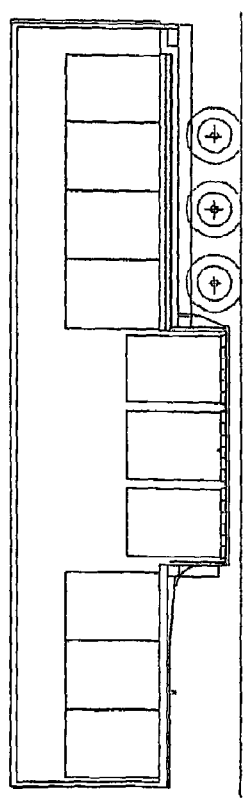
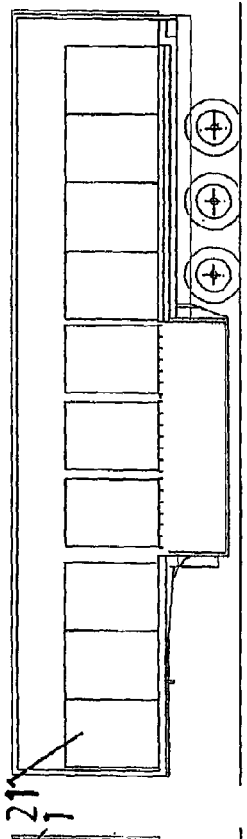
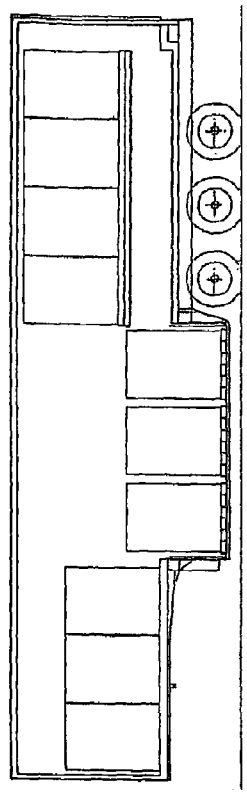
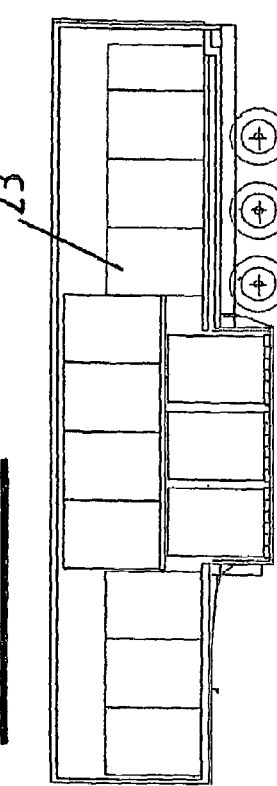
FIG. 6A  FIG. 6B  FIG. 6C  FIG. 6D  FIG. 6E  FIG. 6F

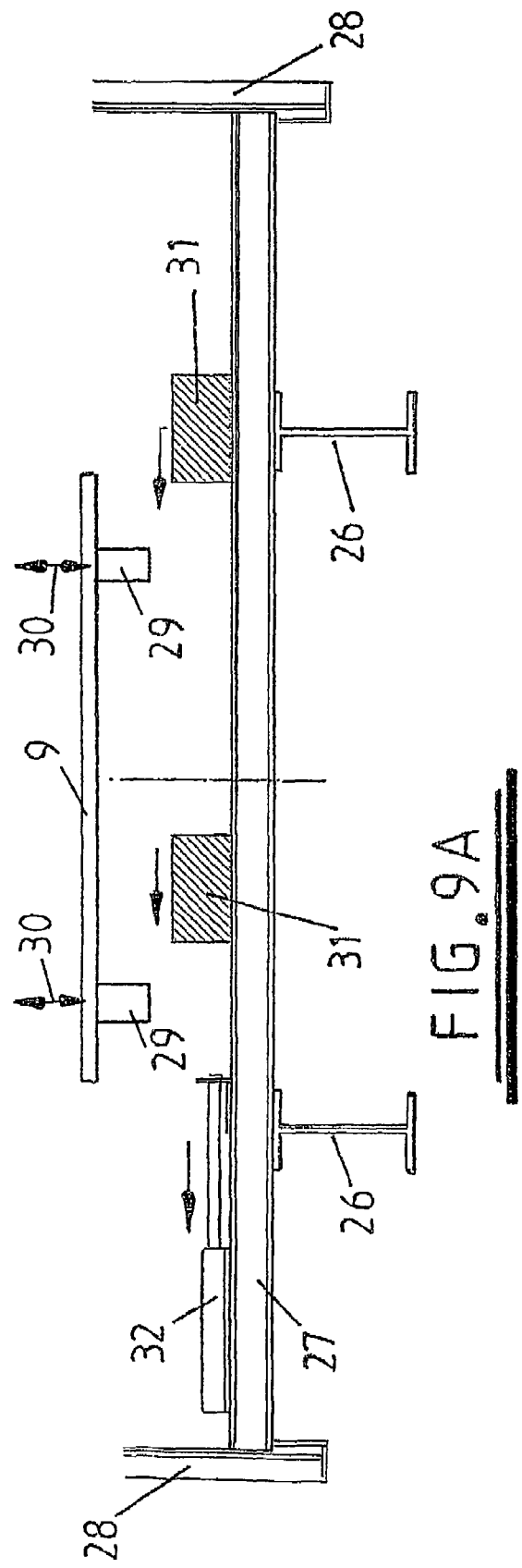

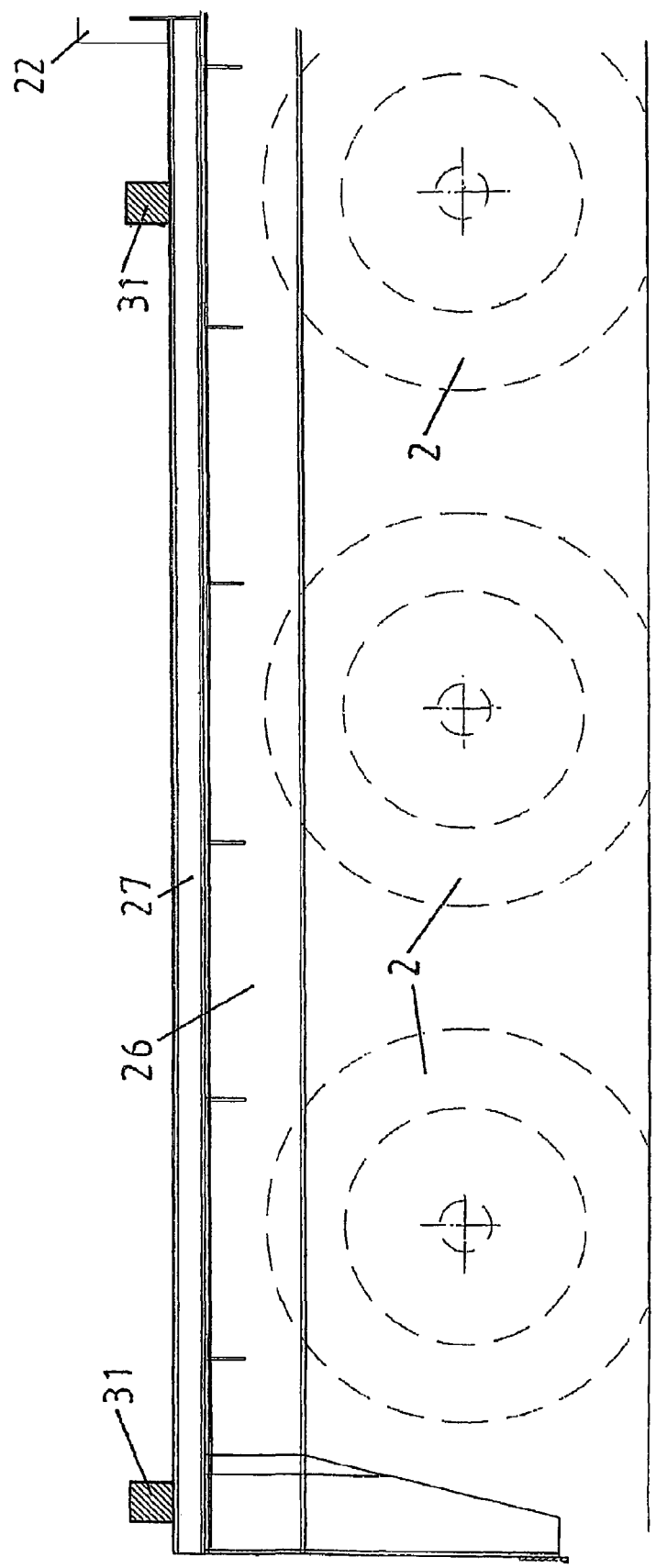

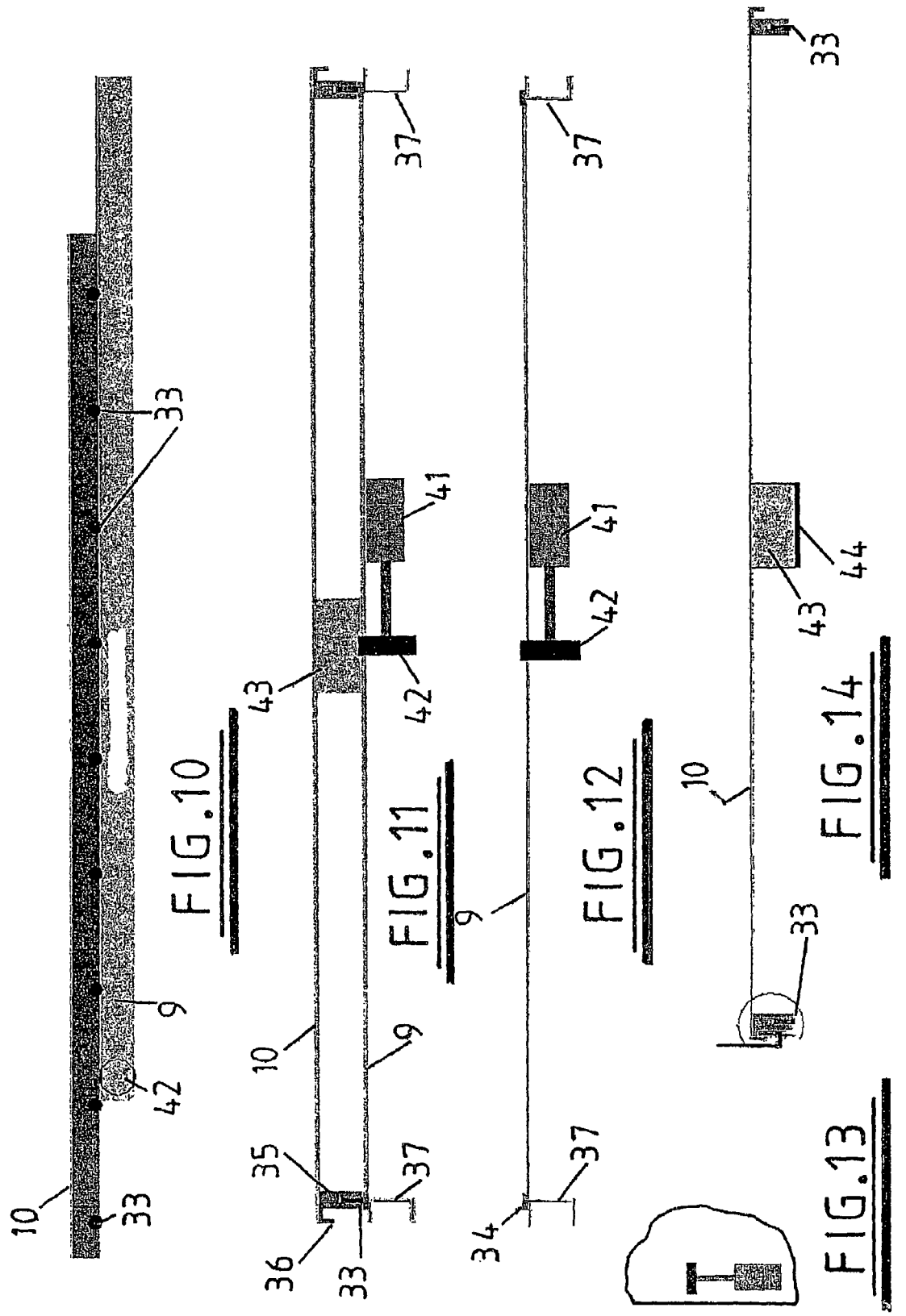

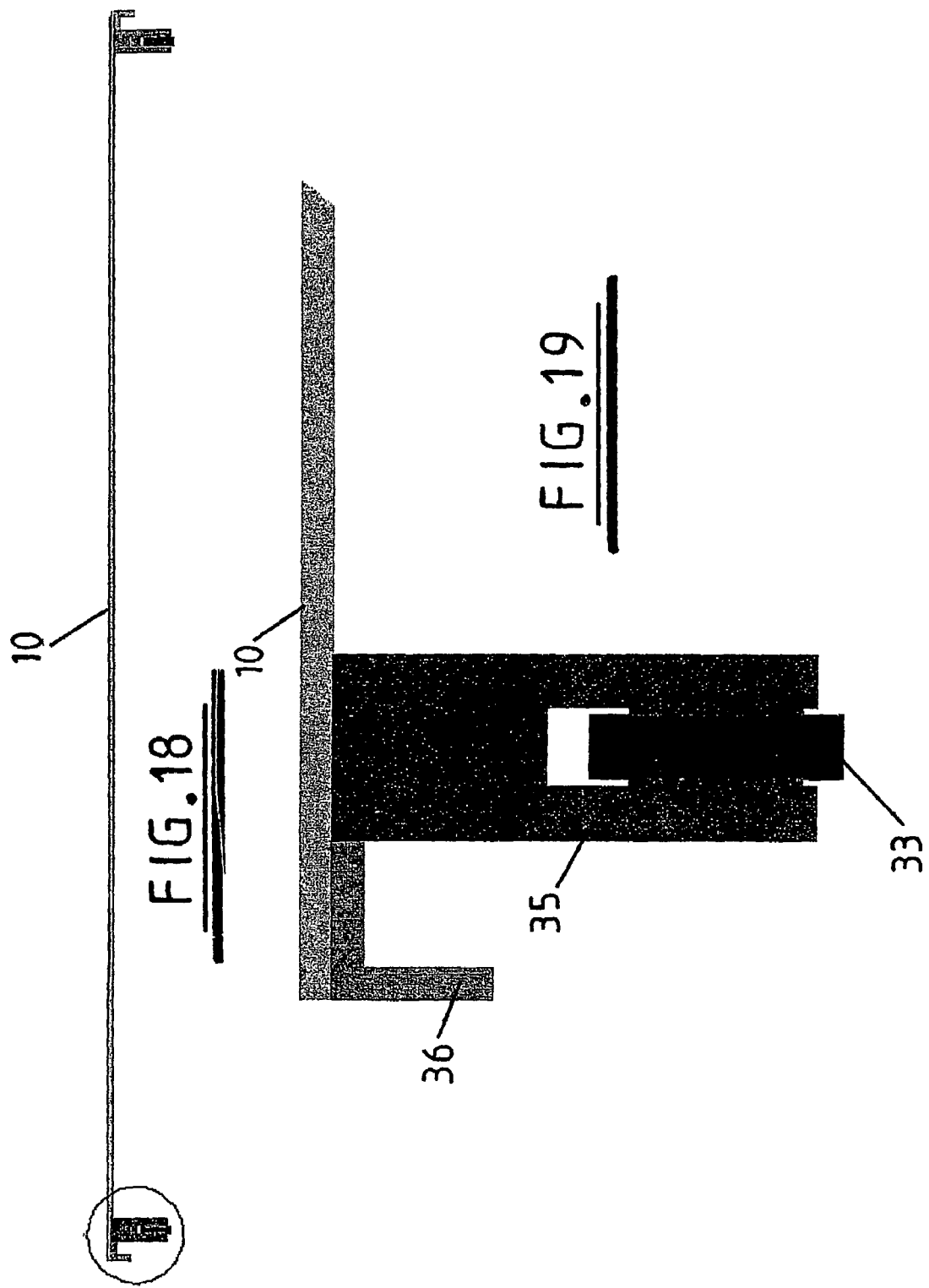

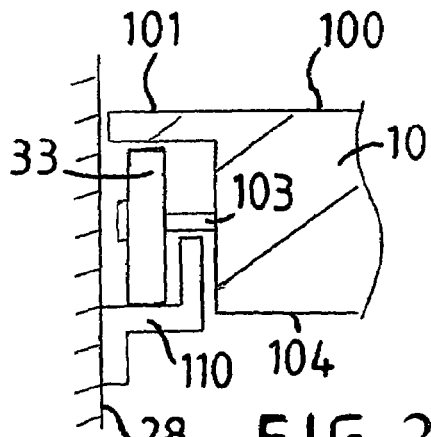
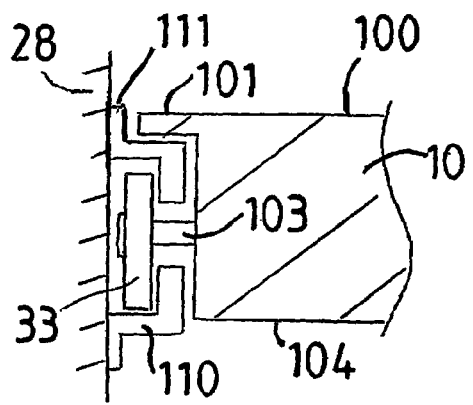
FIG.20  FIG.21
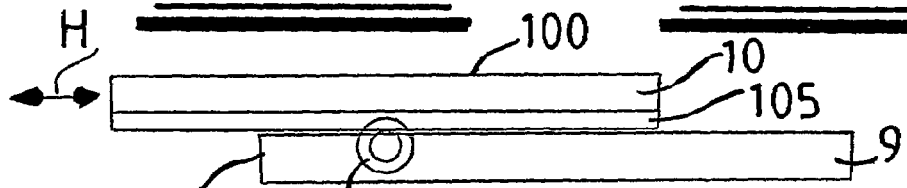
FIG.22
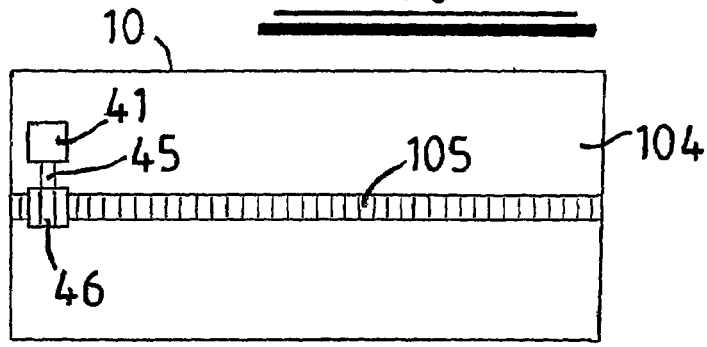
FIG.23
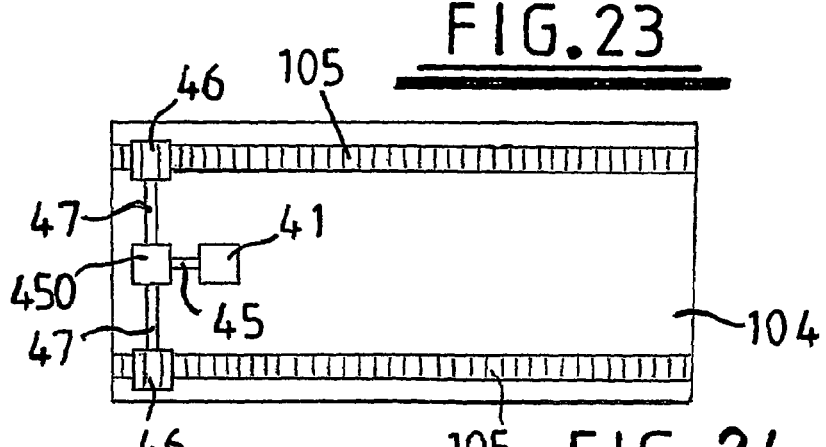
FIG.24

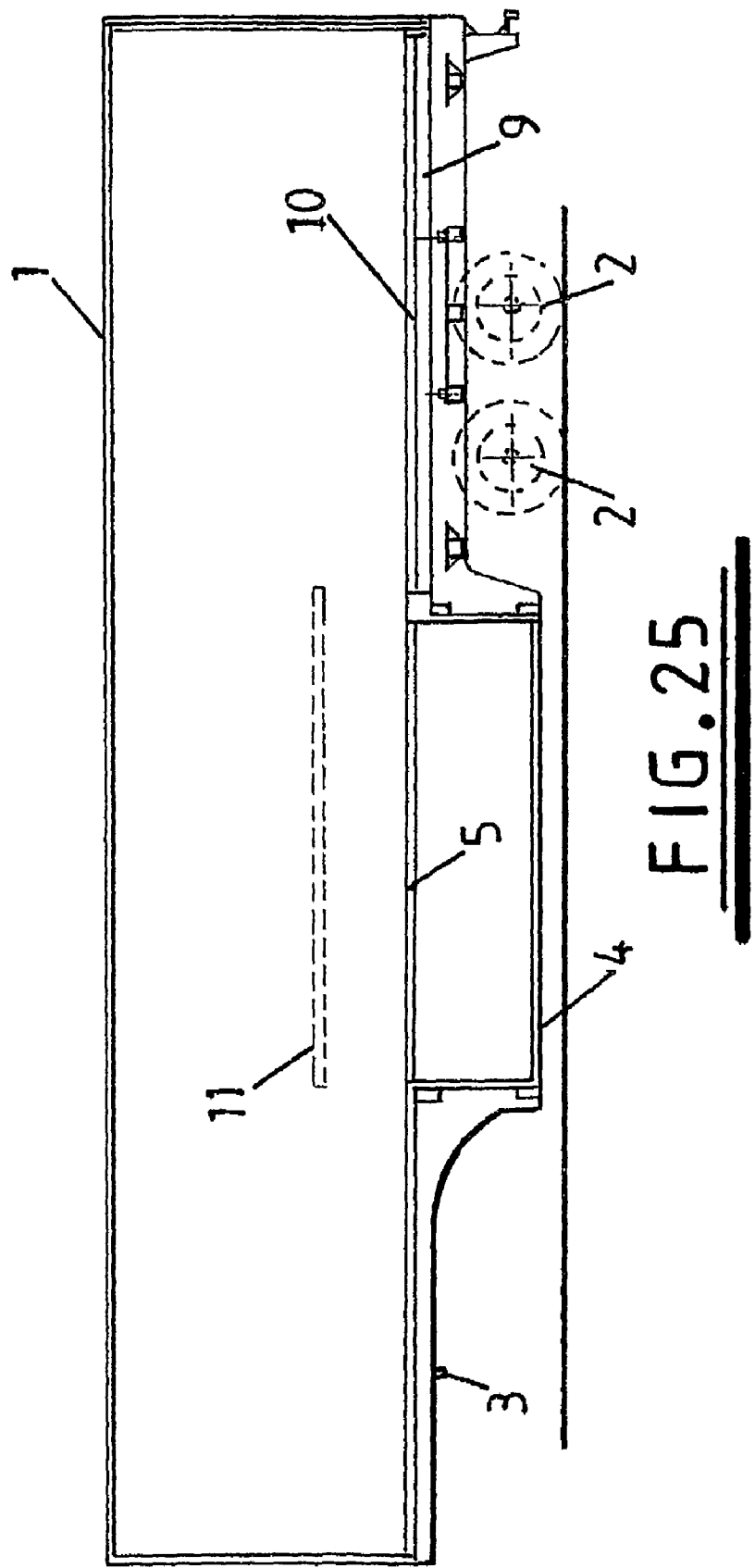

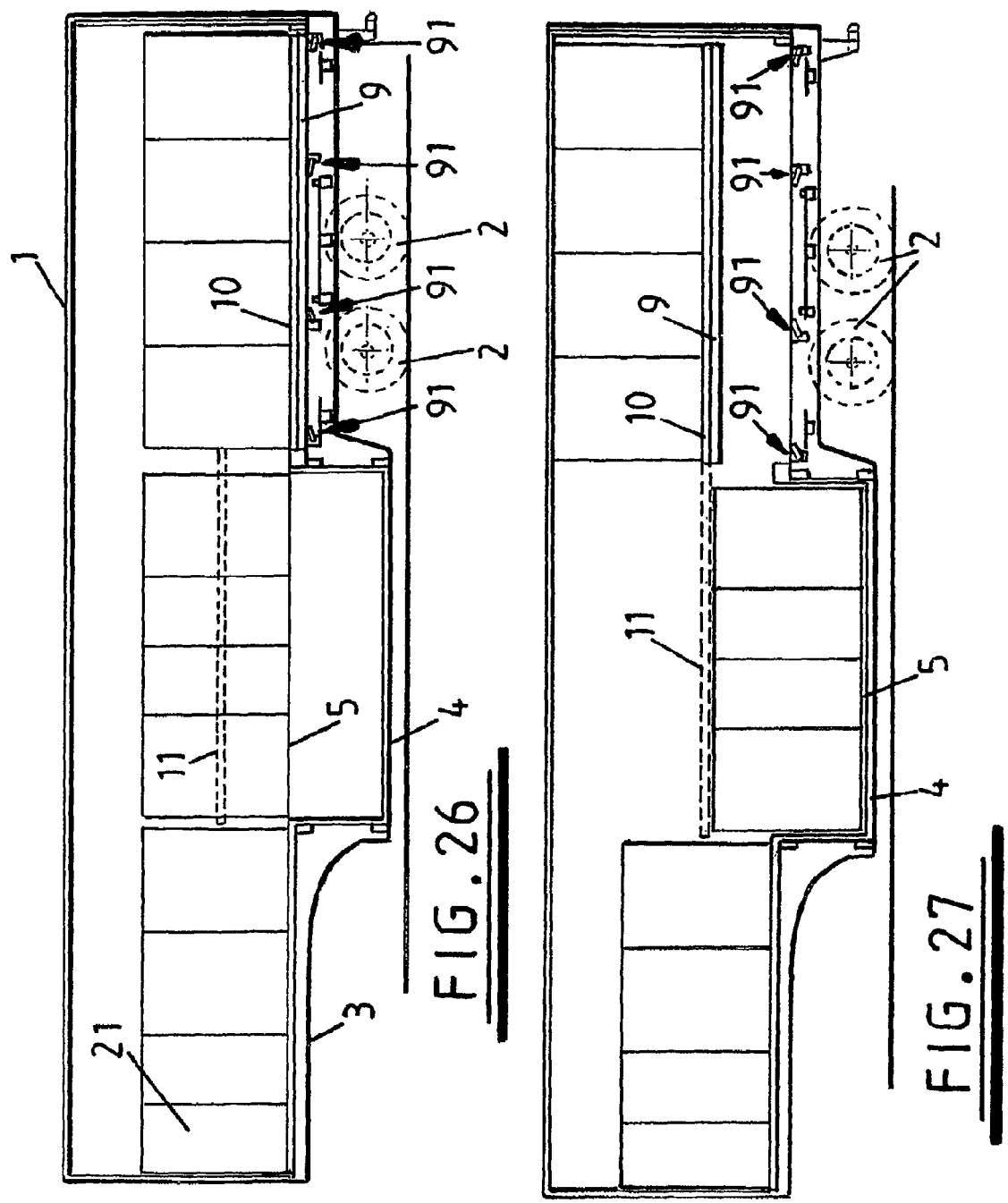

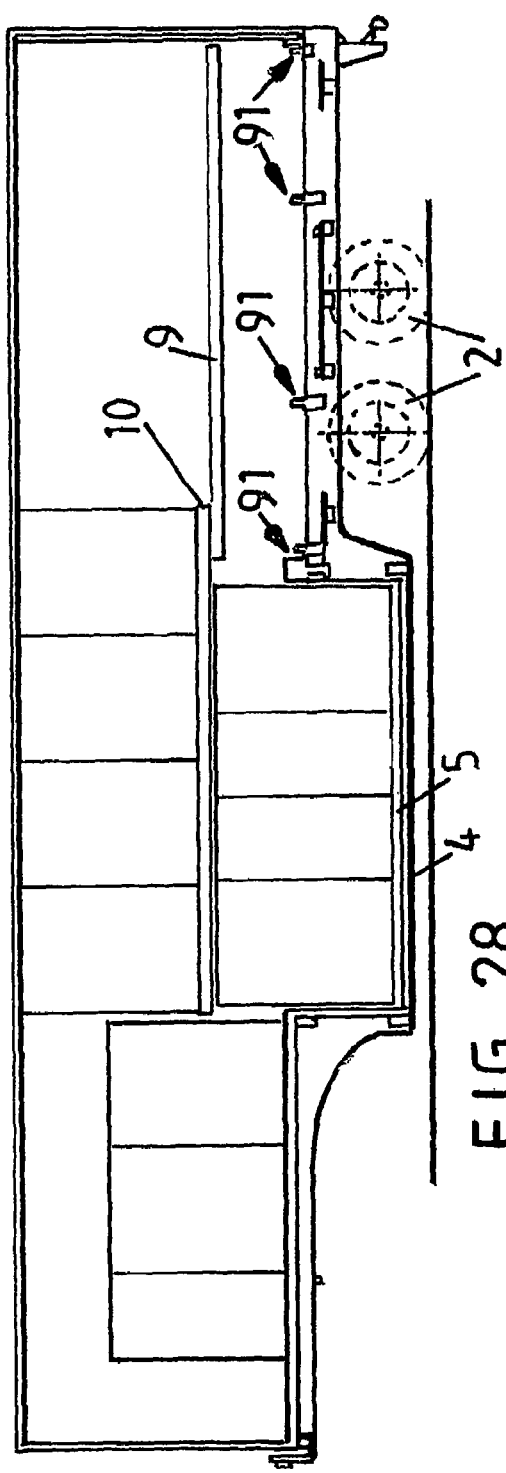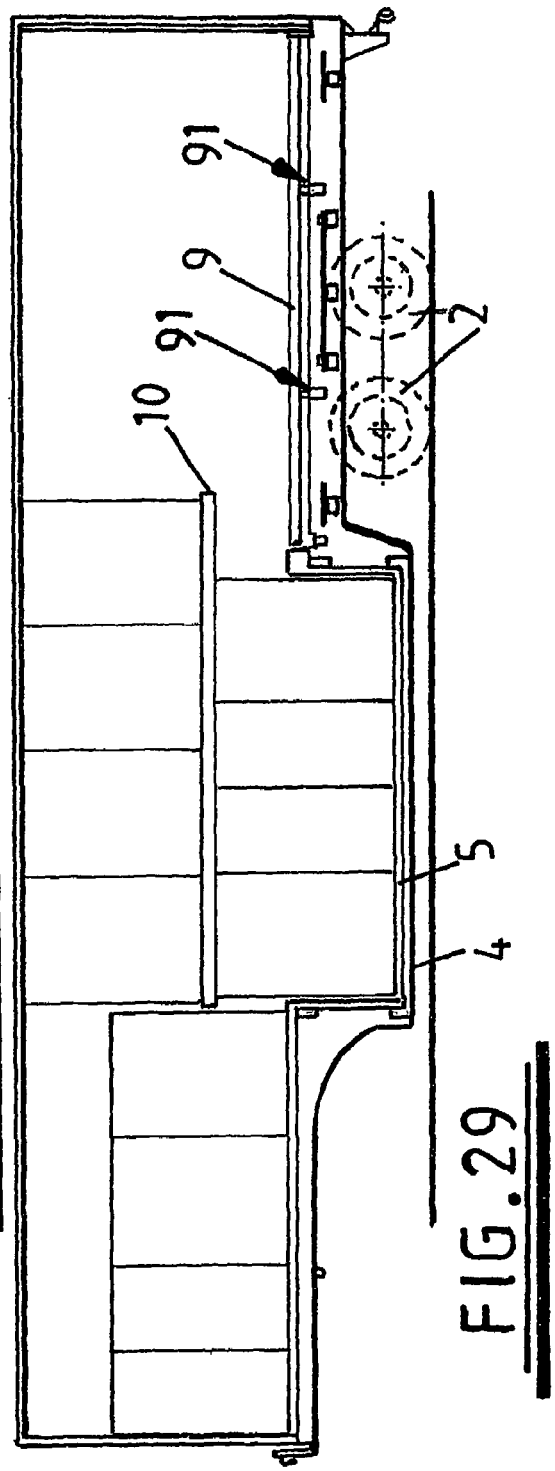

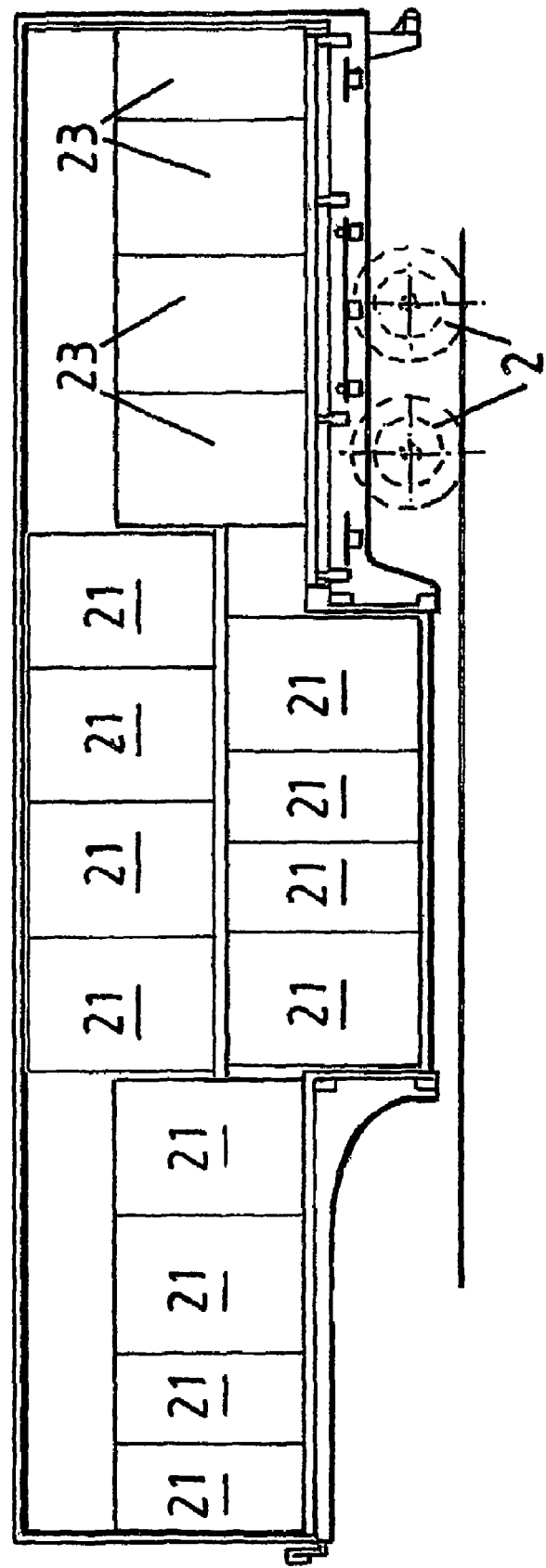

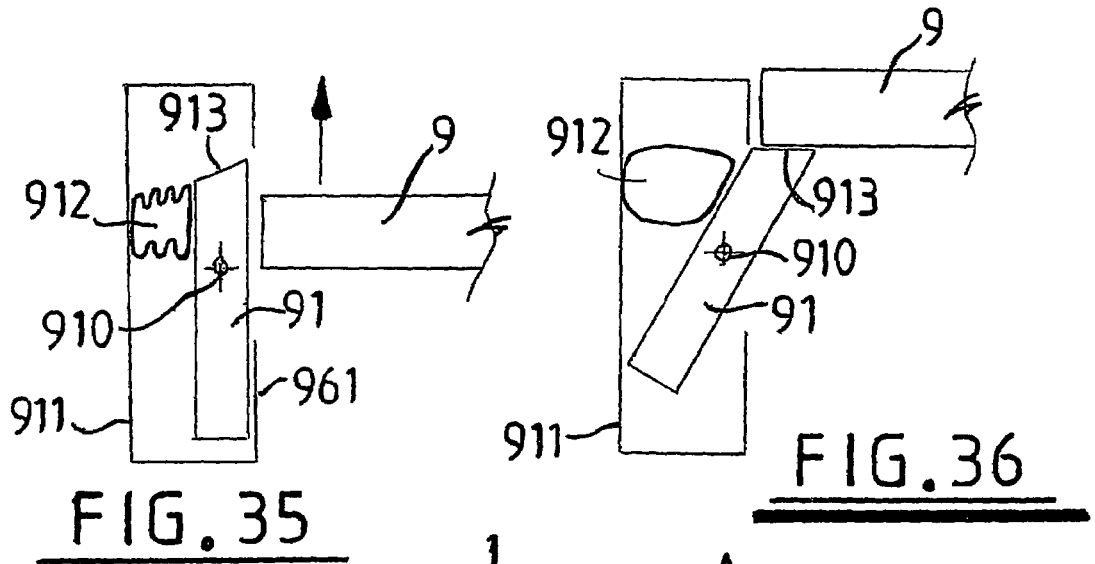
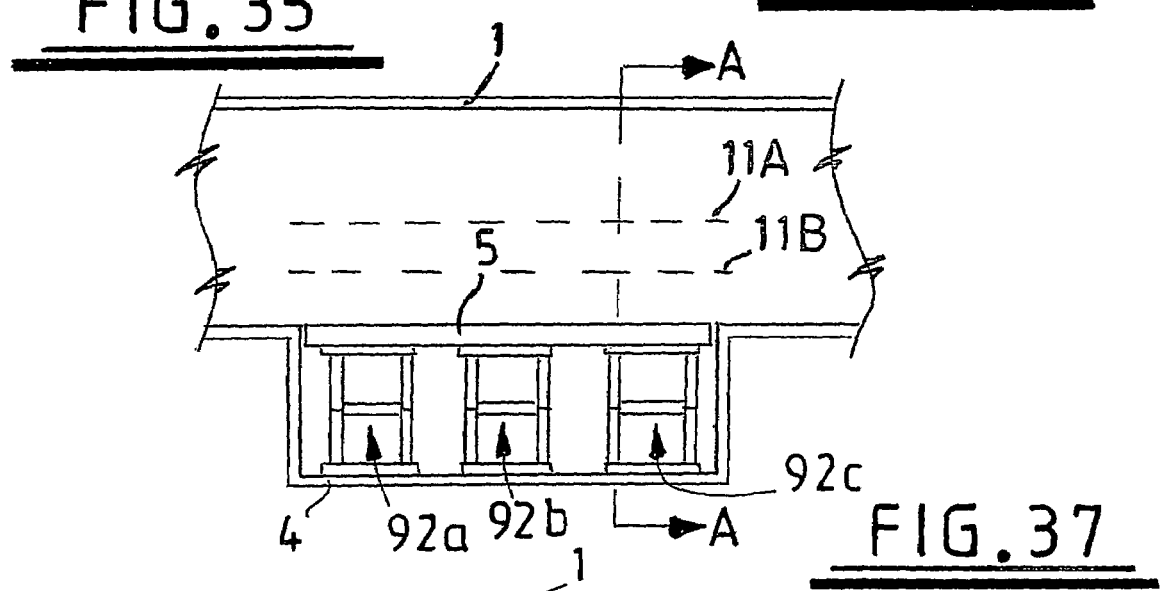
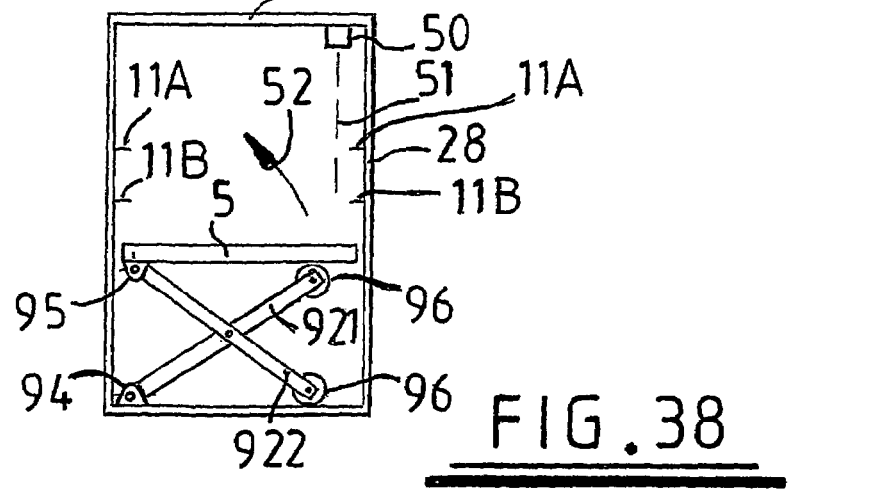

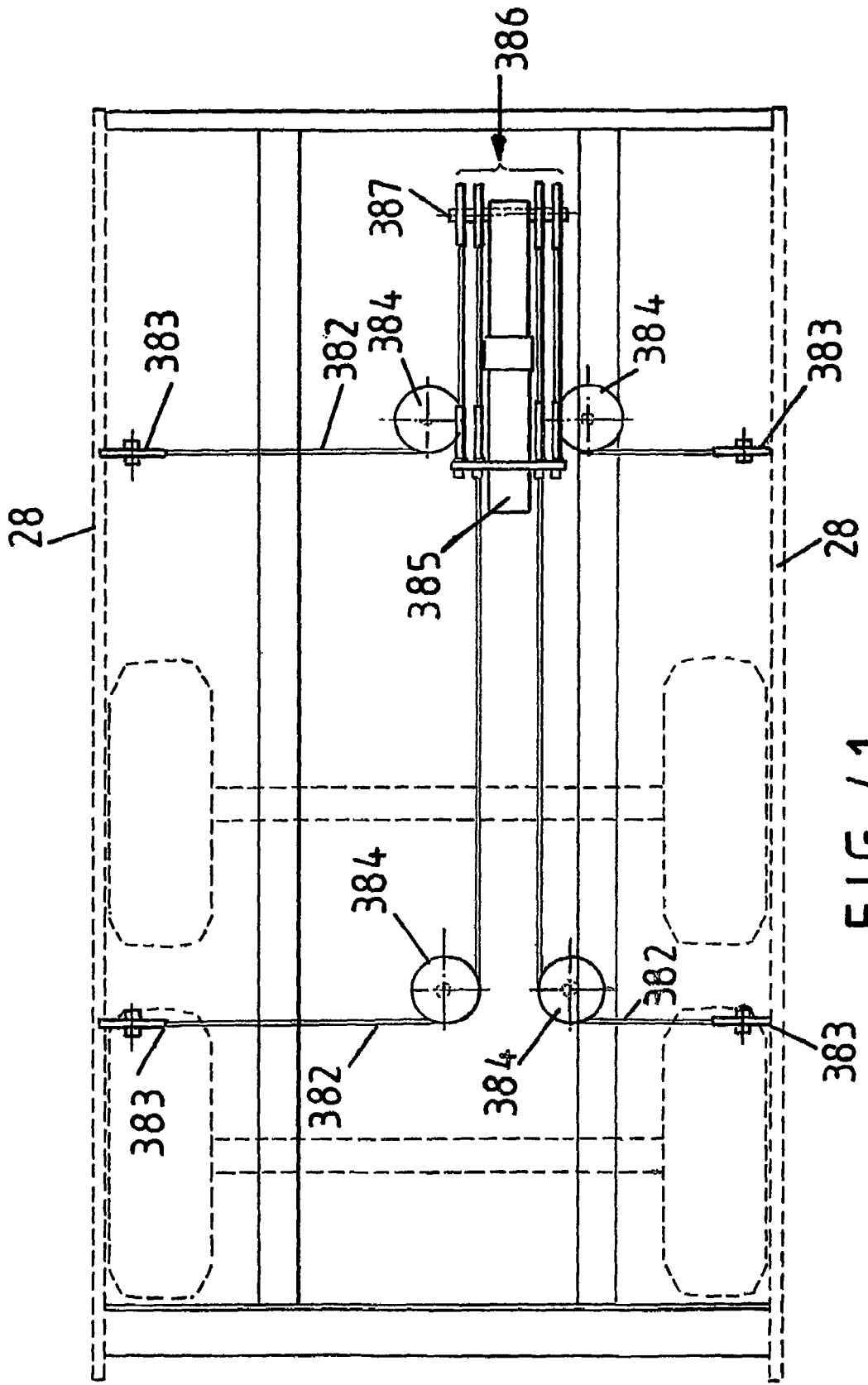

VEHICLES AND TRAILERS INCORPORATING MOVEABLE LOAD CARRYING PLATFORMS

CROSS-REFERENCES TO RELATED APPLICATIONS

This application is a U.S. national application of international application Ser. No. PCT/GB2004/000602 filed Feb. 16, 2004, which claims priority to Great Britain Patent Application No. 0303502.9 filed Feb. 15, 2003 and Great Britain Patent Application No. 0305984.7 filed Mar. 15, 2003.

FIELD OF THE INVENTION

The present invention relates to trailers and vehicles, and in particular, although not exclusively, to trailers and vehicles incorporating a load-carrying well.

BACKGROUND TO THE INVENTION

Conventional trailers provide an enclosable space into which cargo can be loaded for carriage. Such trailers are usually provided with a rectangular frame, and a number of solid panels attached to the rectangular frame. Such trailers are mounted on a chassis comprising suitable running gear, to allow connection of the trailer to a tractor unit for haulage purposes.

In order to maximise the carrying capacity of the known trailer, it is known to lower the base of the trailer between the rear axle and the front hitch of the trailer so as to form a well. Such a modification generally allows additional goods to be stacked within the trailer on top of one another.

One trailer having such a well is described in U.S. Pat. No. 5,092,721. In the trailer of U.S. Pat. No. 5,092,721, there are provided upper and lower cargo carrying surfaces which are rigidly secured together. A hydraulic lift is provided within the well to lift and lower the upper and lower cargo carrying surfaces. Cargo is loaded onto the lower cargo carrying surface when the lower cargo carrying surface is in a first position, such that it is level with a floor of the trailer. The upper and lower cargo carrying surfaces are then lowered using the hydraulic lift, such that the lower cargo carrying surface is positioned at the bottom of the well. Cargo to be carried on the upper cargo carrying surface is then loaded onto a lift which is lifted to be level with the upper cargo carrying surface, whereupon the cargo can be moved from the lift onto the upper cargo carrying surface. The trailer of U.S. Pat. No. 5,092,721 is disadvantageous in that there is no satisfactory way of transferring cargo from the lift onto the upper cargo carrying surface. For example, in some countries, health and safety regulations are likely to prevent a human being from climbing onto the lift to transfer the cargo manually. Furthermore, transferring the cargo manually is likely to be time consuming and labour intensive International Patent Application No. PCT/GB01/00279, publication No. WO 01/62542 (Insulated Structures Ltd et al) describes various mechanisms for loading a trailer. However, each of the mechanisms described in this document is suitable only for loading pallets using a forklift truck, not for carrying roll cages which are often used to carry cargo in trailers, nor for loading pallets using a manually operated pallet-barrow.

It is an object of the present invention to obviate or mitigate at least one of the disadvantages set out above.

It is an object of certain embodiments of the present invention to provide arrangements which make it possible to manufacture trailers and other vehicles incorporating well sections capable of receiving payloads of standard dimensions.

SUMMARY OF THE INVENTION

According to the present invention, there is provided a trailer defining a floor extending from a first end, and comprising at least one first displaceable platform onto which goods can be loaded from the first end of the trailer, the platform being supported such that it can be elevated when loaded and advanced away from the first end of the trailer when loaded.

The trailer may define a well, and may comprise at least one second displaceable platform which can be displaced from a first upper position to a second lower position within the well. The first platform may be elevated and advanced forwards such that at least a part of the first platform is directly above the well.

The first displaceable platform may be carried on a further vertically displaceable platform, the first displaceable platform may be displaceable away from the first end of the trailer after the further vertically displaceable platform has been displaced to an upper position.

Vertical movement of the or each displaceable platform may be effected by hydraulic rams or screw jacks. However, in preferred arrangements pneumatically actuated scissor lift arrangements are used to elevate the support platform and the, or each, well platform. This provides a structure which collapses to very small volume.

Preferably, the trailer comprises supports mounted in or on its sidewalls, to receive and support the load-carrying platform in its elevated, forward position. These supports are preferably in the form of horizontal tracks. Preferably, the load-carrying platform is provided with rollers along its side edges, those rollers engaging the tracks as the platform is driven forwards. Thus, the platform may be maintained in a horizontal position, and be driven forwards such that it rolls onto the sidewall supports. When fully forwards, stops may be activated, and the support platform may be lowered such that it disengages from the load platform.

The first displaceable platform may be advanced forwards only from one or more predetermined vertical positions. The predetermined vertical position may be defined by the tracks provided in or on the walls of the trailer. Typically, these tracks may be fixedly located in the predetermined vertical position, and the first displaceable platform may be advanced forward on the tracks.

The present invention also provides a method for loading a trailer (or vehicle) comprising loading cargo onto a first displaceable platform within the trailer from a first end of the trailer, and elevating and advancing forwards the first displaceable platform carrying said cargo.

Cargo may be loaded onto a second displaceable platform, and the second displaceable platform may be lowered into a well of the trailer.

The, or each, well platform may support projections received within vertical guide tracks fitted to the well walls. The guide tracks ensure the appropriate positioning of the platform within the well. In addition, means may be provided for obstructing upper ends of the guide tracks so that, after a platform has been raised to an elevated position, the guide tracks may be obstructed so that the platform will be prevented from moving downwards from the elevated position. Thus an inherently safe mechanical structure is provided which will protect against accidental lowering of the platforms in the event for example of hydraulic failure.

The present invention also provides a vehicle comprising a first section defining a load-carrying front floor, a rear section defining a rear floor, a well section located between the front and rear sections, and means for lowering payload into the well section, wherein a support platform is vertically displaceable above the rear floor between raised and lowered positions, and the support platform carries a load-carrying platform which is horizontally displaceable over the well when the support platform is in the raised position, the load-carrying platform being displaceable from the support platform onto supports mounted on sidewalls of the vehicle.

Thus a simple and robust mechanism is provided which enables payload to be lifted up and moved over the well section. This is achieved by using low-profile supports in the sidewalls, avoiding any significant reduction in the internal width of the vehicle available for receiving payload.

Rollers may be interposed between the support platform and the load-carrying platform and between the sidewall support and the load-carrying platform. For example, the load-carrying platform may support rollers along its longitudinal edges which run on tracks extending along longitudinal edges of the support platform. The sidewall supports may include rollers on which formations on the longitudinal edges of the load-carrying platform roll. The sidewall support rollers may be mounted on plates defining inner sidewalls of the well section.

The support platform may carry a drive motor for displacing the load-carrying platform over the well. The drive motor may drive a roller which rotates above an axis transverse to the vehicle, which projects above an upper surface of the support platform, and which frictionally engages the surface defined by the load-carrying platform such that rotation of the roller drives the load carrying platform relative to the support platform. Alternatively, the drive motor may drive a pinion arranged to engage a rack provided on the load-carrying platform.

The present invention also provides a vehicle for carrying goods, having a floor extending from a first end, and comprising at least one first displaceable platform onto which goods can be loaded from the first end of the vehicle, the platform being supported such that it can be elevated when loaded and advanced away from the first end of the vehicle when loaded. Preferred features of trailers embodying the invention may also be employed in vehicles embodying the invention, with corresponding advantage.

BRIEF DESCRIPTION OF THE DRAWINGS

Embodiments of the present invention will now be described, by way of example, with reference to the accompanying drawings, in which:

FIG. 1 is a longitudinal sectional view of a trailer in accordance with the present invention;

FIGS. 2a to 2h illustrate the trailer of FIG. 1 as cargo is loaded onto the trailer;

FIGS. 3a and 3b are longitudinal sectional views of the trailer of FIGS. 1 and 2, showing hydraulic lifting gear which is used to move a platform within the trailer of FIG. 1;

FIGS. 4a and 4b are further longitudinal sectional views showing hydraulic lifting gear used to move a platform within the trailer of FIG. 1.

FIGS. 6A to 6F illustrate the loading of standard European pallets onto another trailer embodying the present invention;

FIGS. 9A and 9B illustrate a mechanism for adjusting the floor level of a rear trailer section in an embodiment of the present invention;

FIGS. 10 to 19 illustrate details of a rolling and vertically moveable platform which may be utilised in a trailer embodying the present invention;

FIG. 20 is a schematic representation of a wall-mounted track and platform roller arrangement from an embodiment of the invention;

FIG. 21 is a schematic representation of a wall-mounted track and platform roller arrangement from another embodiment;

FIG. 22 is a schematic representation of the vertically movable platform, horizontally movable platform, and horizontal drive of an embodiment of the invention;

FIG. 23 is a schematic representation of the underside of a horizontally moveable platform and its horizontal drive from another embodiment;

FIG. 24 is a schematic representation of the underside of another horizontally moveable platform and its horizontal drive from an embodiment;

FIGS. 25 to 30 illustrate the loading of cargo onto a trailer embodying the invention;

FIGS. 35 and 36 are schematic representations of a stop mechanism suitable for use in embodiments of the invention to support the vertically movable platform at an elevated position;

FIG. 37 is a schematic longitudinal sectional view of part of a vehicle embodying the invention;

FIG. 38 is a schematic cross section, along line A-A, of the vehicle shown in FIG. 37;

FIG. 41 is a schematic plan view of the lifting mechanism from FIGS. 39 and 40.

DETAILED DESCRIPTION OF EMBODIMENTS OF THE INVENTION

Figure 3A:
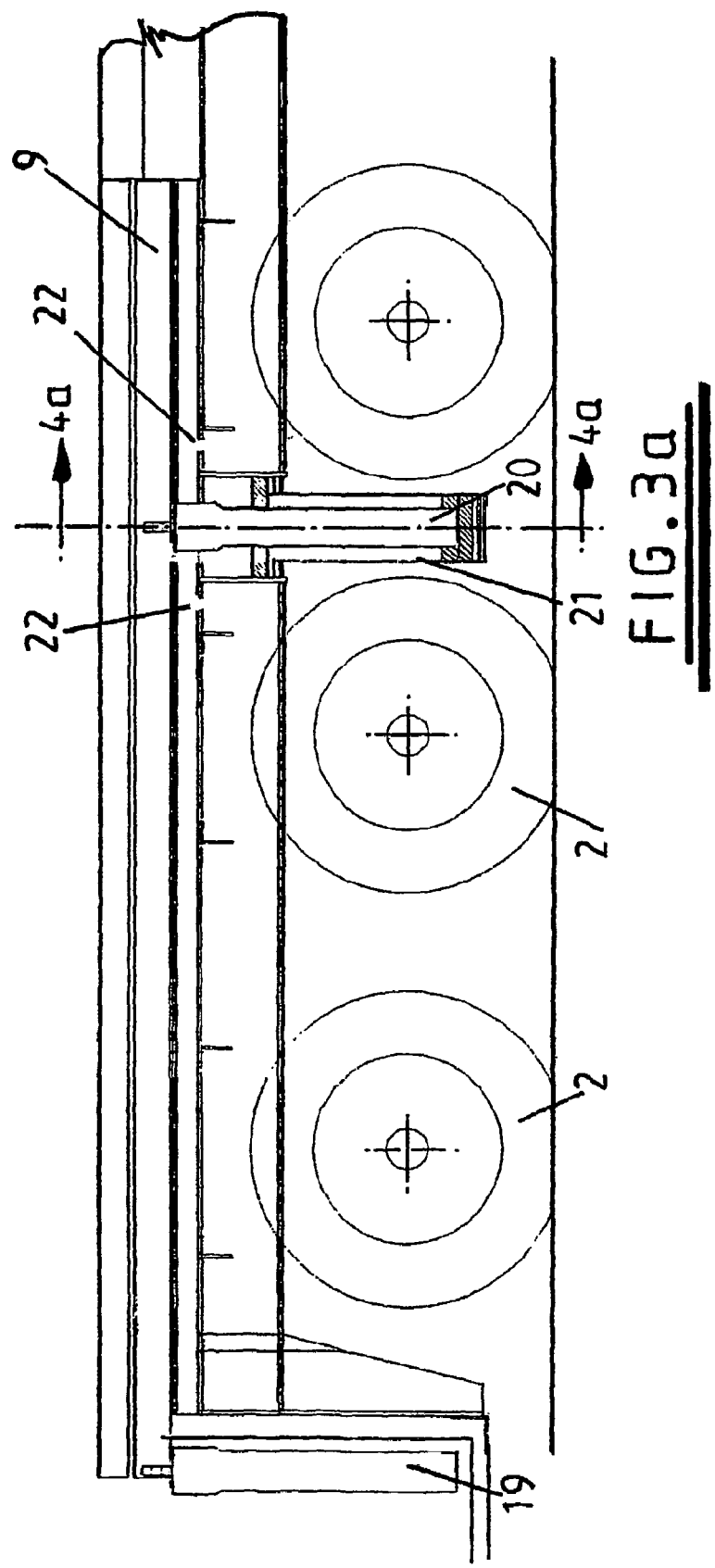

FIG. 1 shows a trailer 1 having three rear axles supporting wheels 2 and a front hitch 3 (which may also be referred to as a king pin, and which typically is received in the fifth wheel of the tractor unit). It can be seen that a central part of the floor of the trailer between the wheels 2 and the front hitch 3 is lower than front and rear floor sections, so as to allow additional cargo to be carried in the lower part of the trailer which is hereinafter referred to as a well 4. It can be seen that, in this example, the well is provided with three vertically moveable platforms 5, 6 and 7 which can be raised and lowered by the action of hydraulic rams 8. In other embodiments, the well may be provided with a different number of platforms, and the well-platform lifting may be achieved by other means. For example, and as will be described later, in certain embodiments the well may have a single platform, lifted by a suitably actuated scissor jack arrangement.

In this first embodiment, a rear part of the trailer 1 is provided with two platforms, that is a vertically moveable platform 9, and a longitudinally moveable platform 10. In use, the vertically moveable platform 9 is lifted such that the longitudinally moveable platform 10 can be moved forwards in tracks 11 formed at either side of the trailer at an appropriate height, as is described with reference to subsequent figures.

Referring to FIG. 2a, it can be seen that pallets 12 have been loaded into the front most part of the trailer 1. This loading can be achieved by using either a fork-lift truck or a manually operated pallet barrow. In either case the cargo enters the trailer through a rear door 13, and is moved across the longitudinally moveable platform 10 which is positioned so as to be level with a rear floor 14 of the trailer. The cargo is then moved over the platforms 5, 6, 7, which are initially level with the longitudinally moveable platform 10, to the front most portion of the floor of the trailer.

Referring to FIG. 2b, it can be seen that pallets 15 are subsequently loaded onto the vertically movable platforms 5, 6, 7. This loading can be achieved as was described with reference to FIG. 2a. When the pallets have been loaded, the vertically moveable platforms 5, 6, 7 are moved downwards by the action of the hydraulic rams 8 such that the platforms 5, 6, 7 are positioned on a floor of the well 4 of the trailer. This configuration is shown in FIG. 2c.

Referring to FIG. 2d, it can be seen that pallets 16 have been loaded onto the longitudinally moveable platform 10. This loading can be achieved in the manner described above with reference to FIG. 2a. When pallets have been loaded onto the longitudinally moveable platform 10, the vertically moveable platform 9 is moved upwards to the position shown in FIG. 2e. In this position, it can be seen that the longitudinally moveable platform 10 is vertically aligned with the tracks 11 which are provided by the sides of the trailer. In this position, the longitudinally moveable platform 10 carrying the pallets 16 can be moved forward in the tracks 11, to adopt the position shown in FIG. 2f This movement of the platform 10 can be achieved by providing the platform 10 in the form of a rolling floor, having a plurality of rollers which, in this example, are each provided with a drive motor When the platform 10 is located at the appropriate height within the trailer, the motors can be energised such that the rollers move the platform 10 forwards on the tracks 11 provided by the trailer. Alternatively, a suitable chain drive or the like could be provided to displace the rolling floor on simple free-running rollers. Indeed, in certain preferred embodiments, a single horizontal drive motor is utilised, carried by the vertically displaceable platform, and which drives the longitudinally moveable platform (which will also be referred to as the load bearing platform) by means of a friction drive or rack and pinion arrangement. It will be appreciated that the drive chain between the drive motor(s) and load-bearing platform may take a variety of forms, and may, for example, include one or more of the following: gears, gear boxes, and drive shafts.

From FIG. 2f, it can be seen that the platform 9 carries support legs 17 which can be extended from its lower surface. When the platform 9 is lowered onto the floor of the trailer (as shown in FIG. 2g), these support legs now ensure that the platform 9 is level with the rear floor 14 of the trailer, given that the platform 10 is supported by the tracks 11 provided by the trailer. Thus, the support legs 17 have a height equal to that of the longitudinally moveable platform 10. The support legs could be automatically extended for example by a suitable hydraulic system (not shown) after the platform 10 has been displaced from its initial position above the platform 9. Alternatively, the platform 9 could be maintained at the level of the rear floor 14 of the trailer as shown in FIG. 2g by for example hydraulically extending support blocks (not shown) from the trailer floor Referring to FIG. 2h, it can be seen that pallets 18 have been loaded onto the platform 9 at the rear of the trailer. The platform 9 is supported by the support legs 17 so as to be maintained level with the rear floor 14 of the trailer.

It will be appreciated from the foregoing description that the present invention allows space usage within the trailer 1 to be optimised, given that the pallets 16 are carried on a platform 10 located above the pallets 15. Furthermore the present invention is advantageous, because all loading positions can be accessed using a manually operated pallet barrow without the need for a forklift truck. However, it will be appreciated that the invention can be used with a forklift truck if desired. Additionally, the invention can be used with roll cages, if it is desired to carry cargo in this way. Also, although the up-and-over platform arrangement has been shown in a trailer, it will be apparent that this arrangement may also be used with advantage in cargo-carrying vehicles with no detachable trailer. Furthermore, the lifting and forwardly-extending double-platform arrangement may provide advantages in cargo-carrying vehicles and trailers that do not possess wells, although when used in conjunction with load-carrying wells the arrangements are particularly advantageous.

FIGS. 3a and 3b illustrate that the platform 9 is raised and lowered by two pairs of hydraulic rams 19, 20, only one ram of each pair being shown in FIGS. 3a and 3b. A first pair of hydraulic rams 19 are positioned within the well 4 of the trailer, while a second pair of hydraulic rams 20 are positioned within respective suitable enclosures 21 (only one of which is shown in FIGS. 3a and 3b) formed between two wheels 2 of the trailer, such that each of the second pair of hydraulic rams passes through the floor 22 of the rear part of the trailer 1. It will be appreciated that if the trailer is to be insulated so as to carry goods under temperature controlled conditions, the enclosures 21 and its attachment to the trailer is designed so as to ensure that the insulated nature of the trailer is not compromised.

FIG. 3b shows the trailer when the hydraulic rams 19, 20 have been extended so as to raise the platform 9. It can be seen that the first hydraulic ram 19 includes a piston 23 which extends out of a cylinder to lift the platform 9. Similarly, the second hydraulic ram 20 includes an piston 24 which extends to lift the platform 9.

FIGS. 4a and 4b show further views of the hydraulic ram 20, taken on the line 4a-4a of FIG. 3a, and the line 4b-4b of FIG. 3b respectively. It can be seen from FIGS. 3a and 3b, and 4a and 4b that the platform 9 is raised and lowered by the action of four hydraulic rams.

Figure 5A:
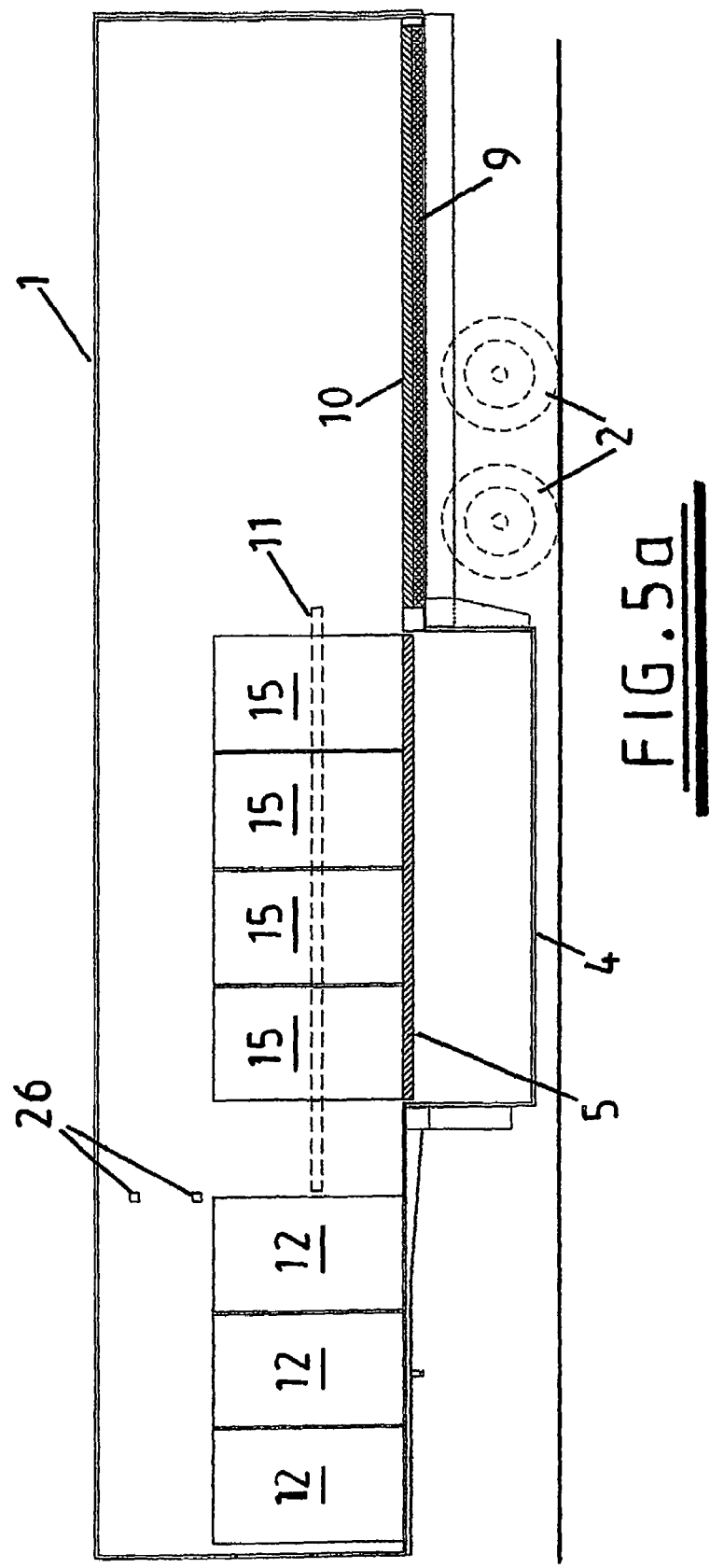
FIGS. 5a and 5b are longitudinal sectional views of another trailer in accordance with the present invention.
Figure 5B:
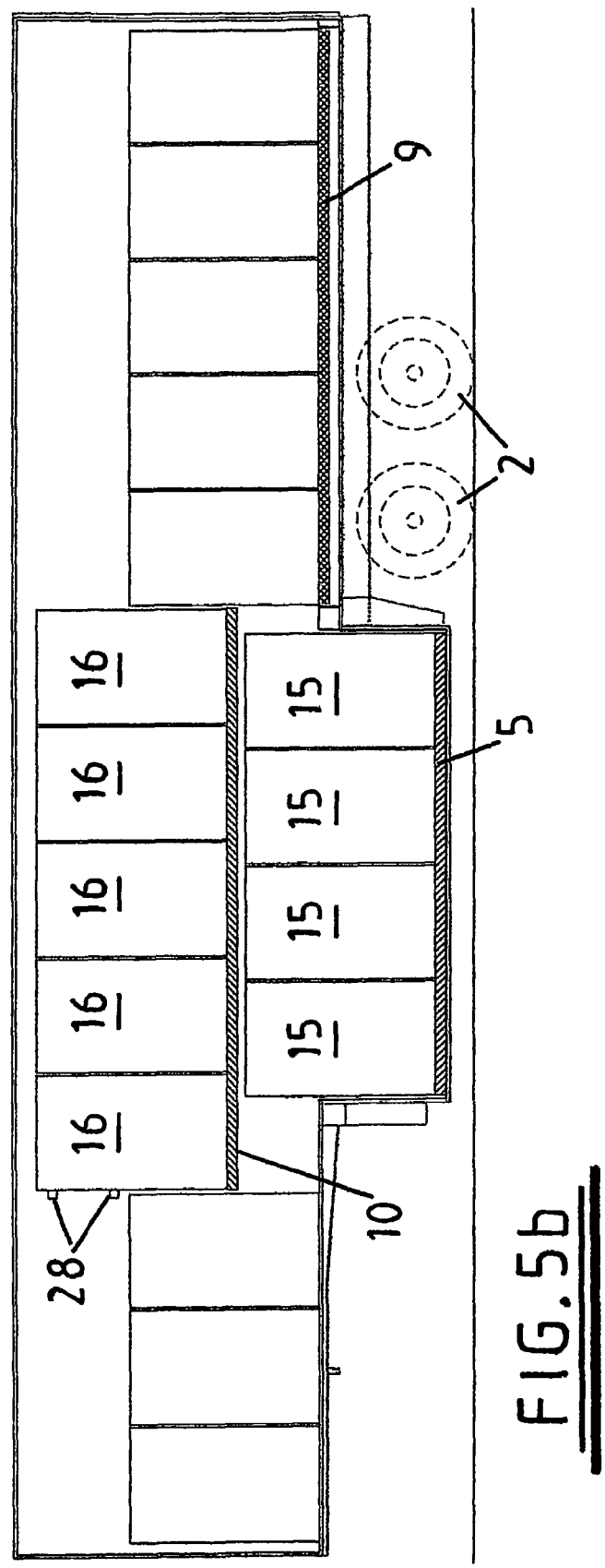
Figure 7A:
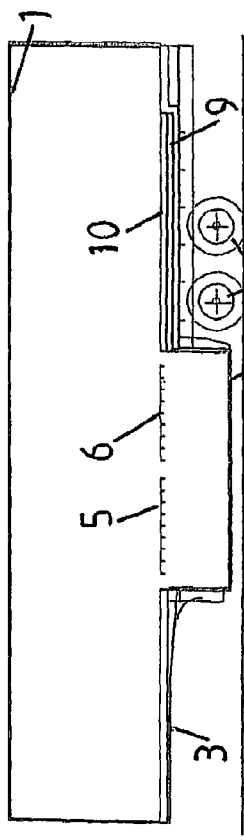
FIG. 7A to 7F illustrate the loading of roll cages onto a trailer embodying the present invention.
Figure 7C:
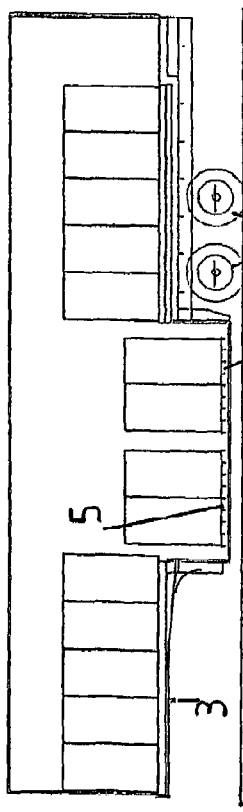
Figure 7E:
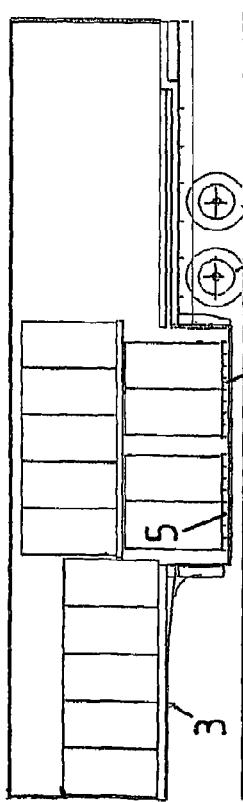
Figure 7B:
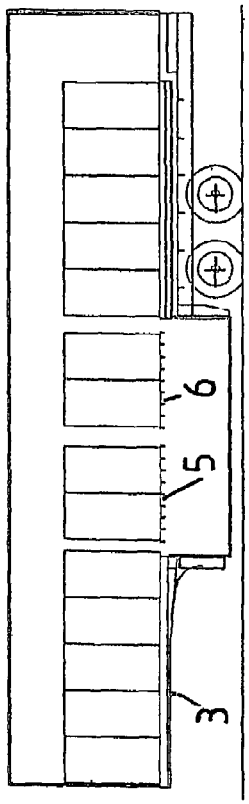
Figure 7D:
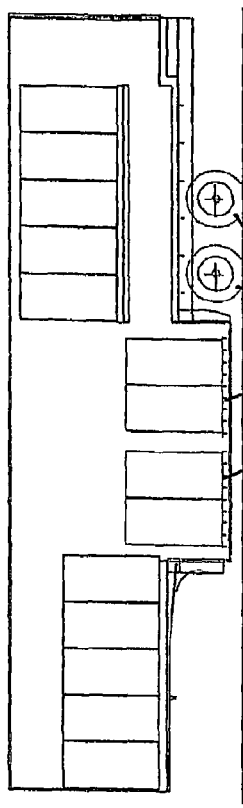
Figure 7F:
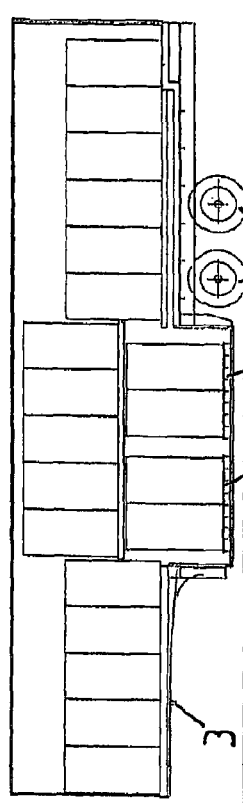
Figure 8A:
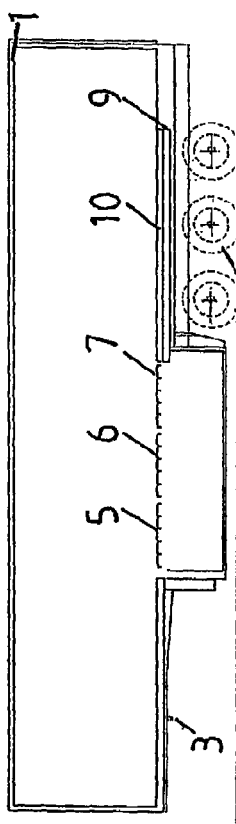
FIGS. 8A to 8F illustrate the loading of standard British pallets onto a further trailer embodying the present invention.
Figure 8C:
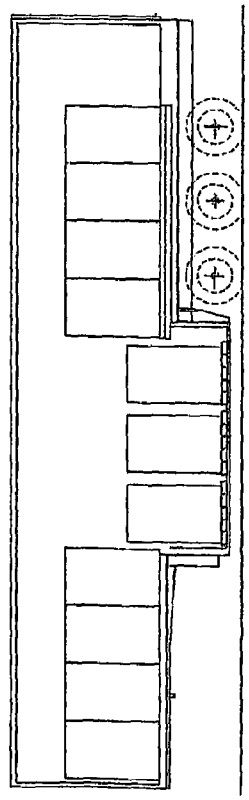
Figure 8E:
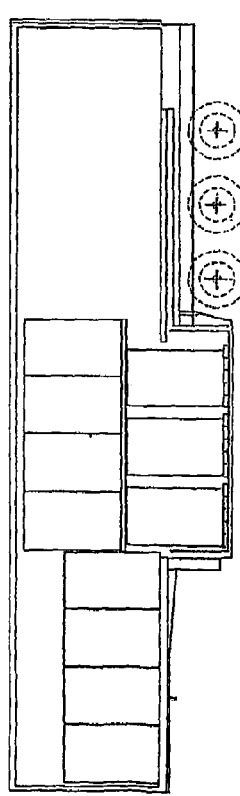
Figure 8B:
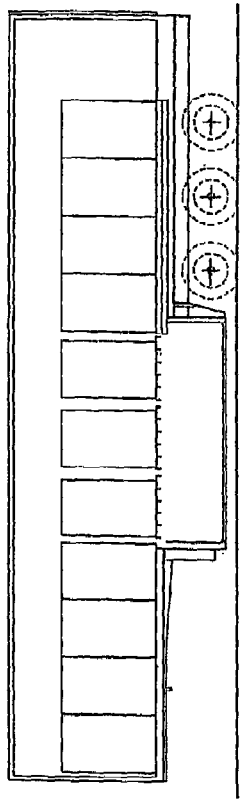
Figure 8D:
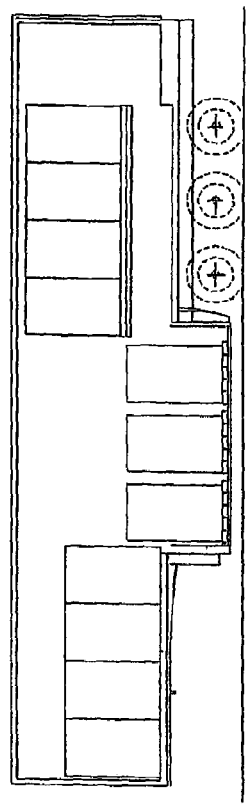
Figure 8F:
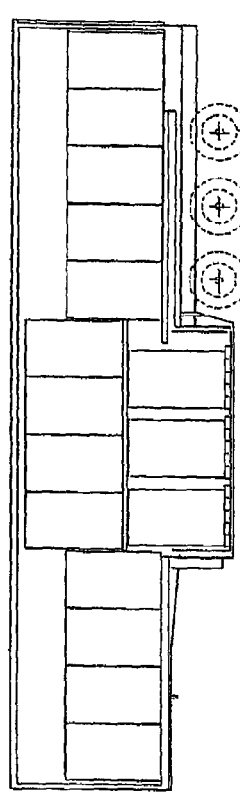
Figure 16:
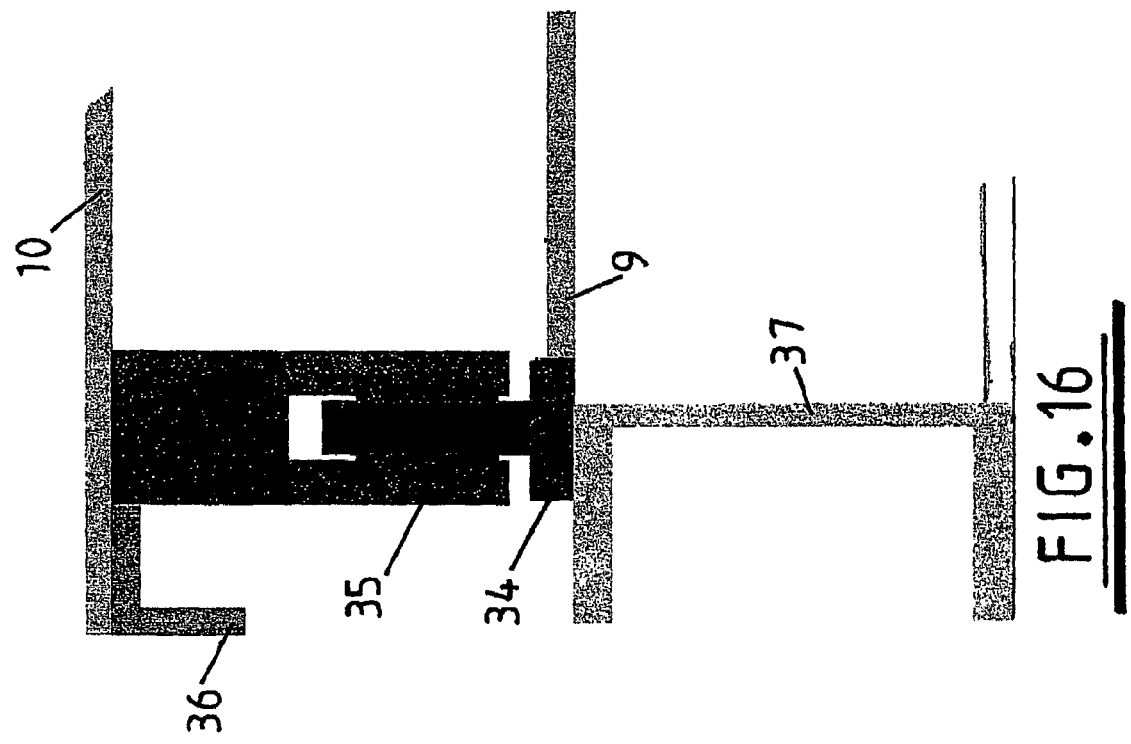

FIGS. 5a and 5b, illustrate a further embodiment of a trailer in accordance with the present invention. Operation of the trailer of FIG. 5 is effectively the same as that of FIGS. 2, 3 and 4, however it should be noted that in the embodiment of FIGS. 5, the three platforms 5, 6, 7 are implemented as a single platform 5 which is moveable within the well 4. Additionally, two support bars 26 are inserted into the trailer after the pallets 16 have been loaded into the trailer. These bars 26 prevent forwards movement of the pallets 16 within the trailer 1. It can be seen that the trailer of FIGS. 5a and 5b has only two rear wheels 2, and thus, the well 4 can be of larger size. Thus, as can be seen in FIG. 5b, four pallets can be fitted into the well 4 in each row.

The three platforms 5, 6 and 7 shown in FIG. 1 can be independently raised and lowered which makes it possible to gain access to the underside of one platform which is raised if an adjacent platform is lowered. Maintenance is thus facilitated. In contrast, access beneath the single platform 5 shown in FIGS. 5*a* and 5*b* is via an access in the form of a removable hatch (not shown) in the platform.

In another embodiment of the invention, illustrated in FIGS. 6A to 6F, once again the illustrated trailer comprises a front section and a rear section separated by a well 4 within which three vertically moveable platforms 5, 6 and 7 (the well platforms) are located. Initially the platforms 5, 6 and 7 are aligned with the floor of the front section of the trailer and with an upper surface of a vertically and horizontally moveable platform 10 supported in the rear section of the trailer. The platform 10 is mounted on a support platform 9, the support platform 9 being moveable in the vertical direction so as to elevate the platform 10, and the platform 10 being displaceable in the horizontal direction after the support platform 9 has been elevated.

As shown in FIG. 6B, initially the movable platforms are arranged to provide a level loading surface extending along the entire usable length of the interior of the trailer. This facilitates loading. Then, ten pairs of pallets 21 are loaded into the trailer. The platforms 5, 6 and 7 are then lowered as shown in FIG. 6C, and the support platform 9 is elevated as shown in FIG. 6D. The platform 10 is then rolled forward onto supports provided in the trailer walls and the platform support 9 is lowered, an in doing so disengages from the rolling platform 10, so that an upper surface defined by the support platform 9 is aligned with a short floor surface 22 at the entry end of the trailer. Further pallets 23 are then loaded into the rear section of the trailer. It will be appreciated that loading is facilitated because at no time does a loader have to load a pallet directly into an elevated position within the trailer. All loading and unloading is performed at the level of the short floor surface (i.e. just as if one were loading a conventional trailer, without central well or rolling/lifting platforms).

FIGS. 7A to 7F illustrate an arrangement similar to that of FIGS. 6A to 6F but in which only two platforms 5 and 6 are provided within well 4. The illustrated configuration is appropriate for the loading of roll cages rather than pallets. As in the case of the embodiment of FIGS. 6A to 6F, platforms 5 and 6 are initially elevated and the trailer is filled with roll cages. The platforms 5 and 6 are then lowered (FIG. 7C) and roll cages loaded into the rear section of the trailer are then raised and moved forward over the platforms 5 and 6. The final loading of the trailer is then completed by loading roll cages into the rear section of the trailer.

Referring now to FIGS. 8A to 8F, this shows an arrangement very similar to that illustrated in FIGS. 6A to 6F, but whereas the arrangement of FIGS. 6A to 6F is appropriate for carrying pallets of standard European dimensions the arrangement of FIGS. 8A to 8F is designed for carrying pallets having the dimensions of standard British pallets. Once again, in the embodiment of FIGS. 8A to 8F pallets initially loaded in the rear section of the trailer are raised and pushed forwards over previously loaded pallets which have been lowered into the well 4.

Details of the structures and mechanisms which make it possible to manufacture trailers capable of the operations described with reference to FIGS. 1 to 8 are given in the following description. The first detail to be described with reference to FIGS. 9A and 9B is that which enables the combination of rear load platform 10 and support platform 9 of FIGS. 6A to 6F to be initially positioned so that the upper surface of platform 10 is aligned with floor section 22 (see FIG. 6A) and then for the upper surface of support platform 9 to be aligned with floor section 22 (FIG. 6E).

Referring in detail to FIGS. 9A and 9B, the rear section of the trailer comprises beams 26 supporting an insulated floor 27 and extending between insulated sidewalls 28. The support platform 9 (see FIGS. 6A to 6F) is mounted on vertically displaceable support beams 29 above the floor 27 such that the support platform 9 can be moved in the direction indicated by arrows 30. Two pairs of blocks 31 are supported on a slide above the floor 27 and coupled to a hydraulic actuator 32 so as to be displaceable from the position shown in FIG. 9A to a position (not shown) in which the blocks are located vertically beneath the beams 29.

When the platform 10 is in its initial position as shown in FIG. 6A, the blocks 31 are in the position shown in FIG. 9A so that the beams 29 can be lowered into contact with the floor 27. After the support platform 9 has been raised and the platform 10 has been displaced over the well of the trailer, the blocks 31 are moved to the left in FIG. 9A until they are located beneath the beams 29. The support platform 9 is then lowered until the beams 29 rest on the blocks 31. As a result the upper surface of the support platform 9 now assumes the vertical position initially assumed by the upper surface of the platform 10, that is aligned with the surface 22 (FIG. 6E). Thus a simple mechanism is provided which ensures that the surface onto which a forklift truck or the like has to be driven is vertically aligned with the edge of the trailer floor adjacent the entry end of the trailer.

Vertical displacement of the support platform 9 may be achieved using hydraulic actuators (not shown) extending vertically beneath the floor 27, or any other convenient means, for example a pneumatically-actuated scissor-lift arrangement such as that described below, which may conveniently also be used to vertically displace platforms within the well section of the trailer or vehicle.

Referring now to FIGS. 10 to 19, details of one arrangement for enabling the platform 10 of FIGS. 1 to 8 to be pushed forward within the trailer will be described. FIG. 10 shows the upper horizontally displaceable platform 10 after it has been pushed forward partially relative to the lower support platform 9. Each edge of the platform 10 carries a row of rollers 33 (FIG. 17) which are aligned with a flat roller track 34 extending along a respective edge of the support platform 9. The rollers 33 are carried in a support beam 35 connected to an outwardly projecting angle 36. The lower edge of angle 36 is intended to run on rollers provided in the sidewalls of the trailer above the well. The support platform 9 is reinforced by side beams 37 located beneath the tracks 34.

Figure 15:
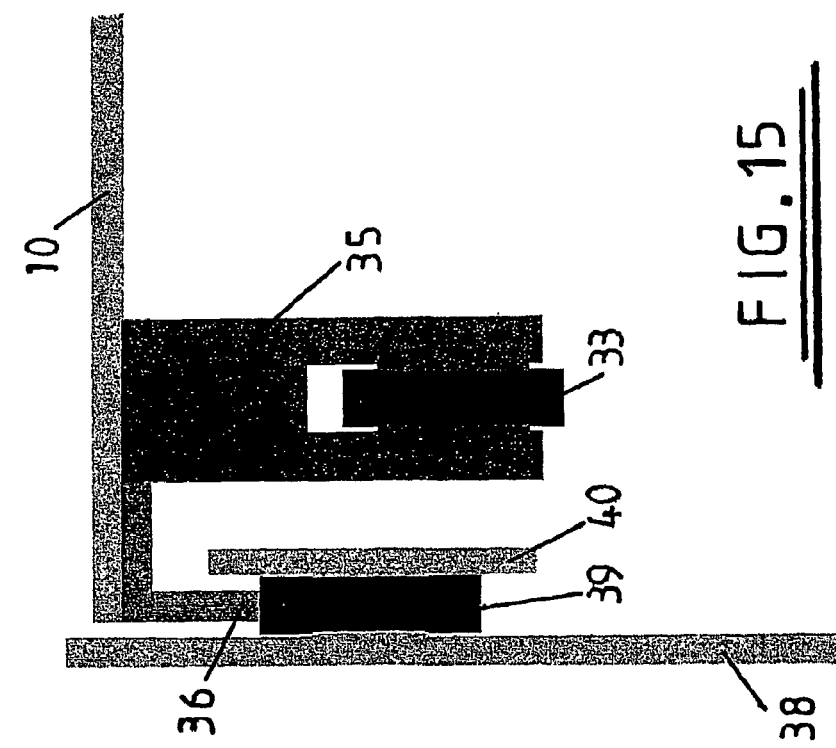
Figure 17:
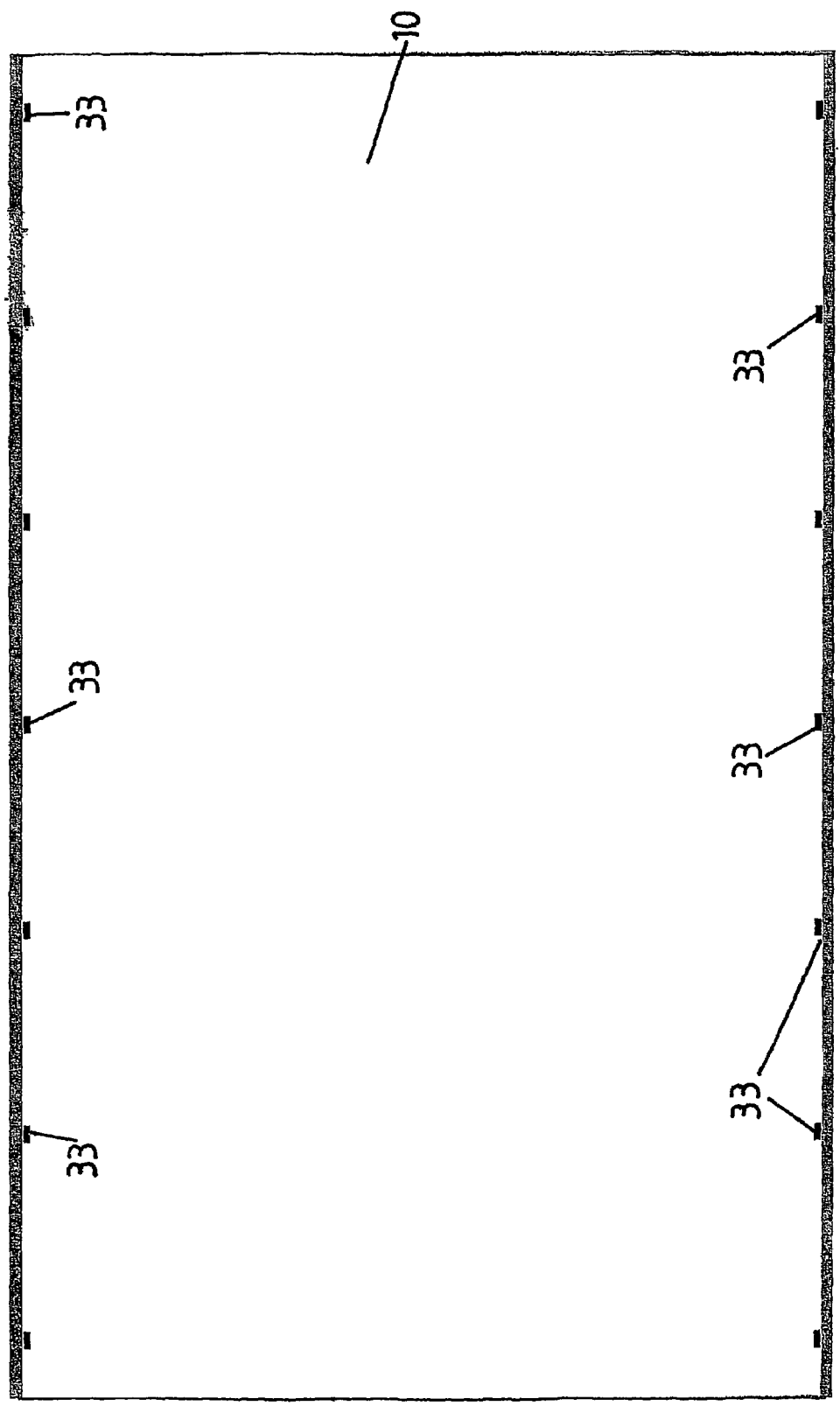
Figure 31:
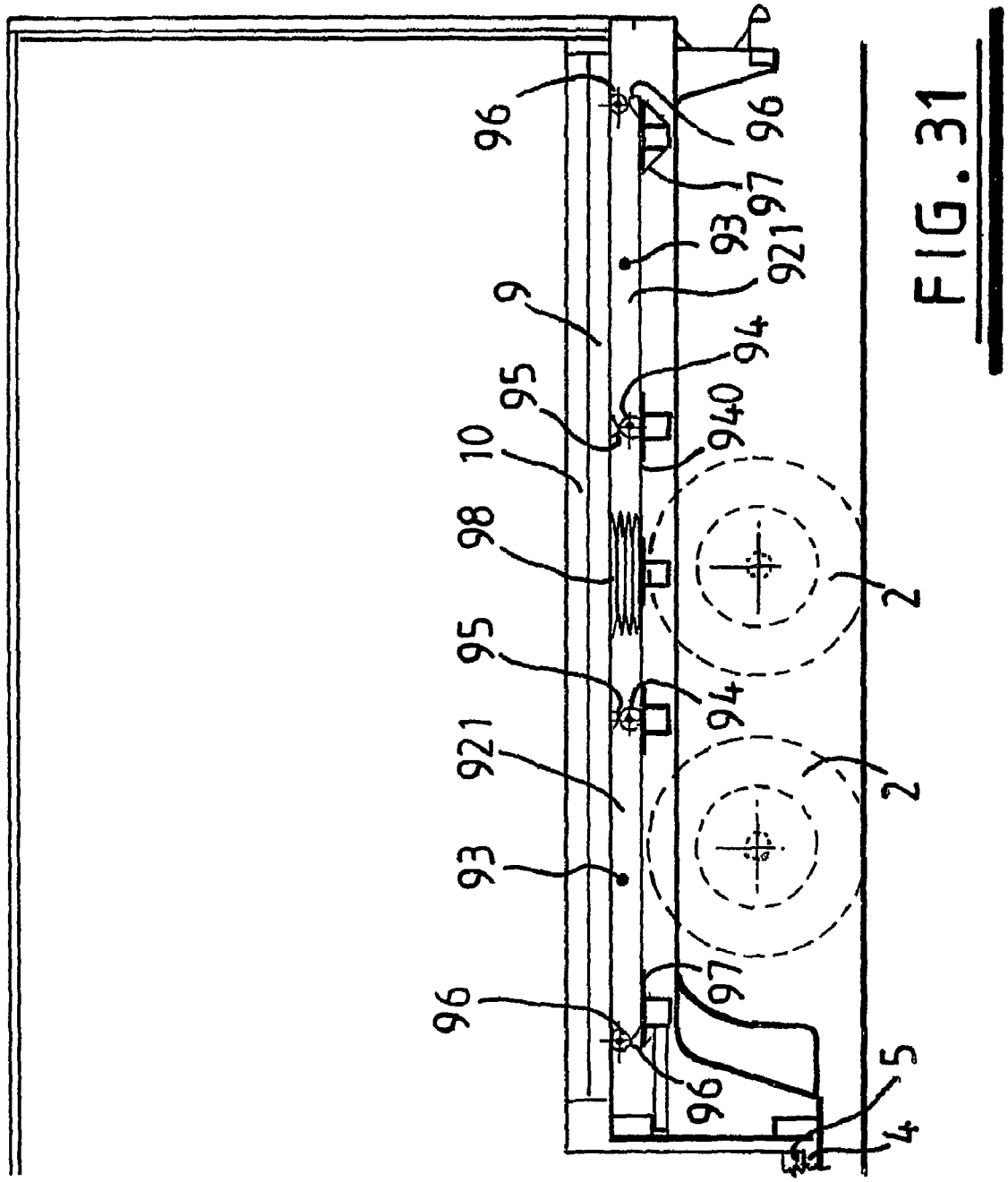
FIG. 31 is a side view of the rear platforms and lifting mechanism of a trailer embodying the invention, in the initial lowered, loading position.

FIG. 15 shows one edge of the platform 10 after it has been displaced from its initial position above the support platform 9 onto supports provided on the trailer walls. A plate 38 secured to an inner wall of the trailer carries rollers 39 which are located behind a cover plate 40. A series of rollers is provided along each side of the trailer wall above the well so as to provide a roller track onto which the angle 36 supported by the platform 10 can be displaced. When the platform 10 is fully supported on the rollers 39 the rollers 33 carried by support beams 35 are not in contact with any support surface.

Various mechanisms may be provided for applying a force to the platform 10 so as to displace it on and off the support platform 9. Simple motor and chain drive assemblies could be provided in the support platform 9 but an alternative arrangement is illustrated in FIGS. 10 to 14 in the form of a motor 41 driving a wheel 42 which projects upwards through an aperture in the support platform 9 as shown in FIG. 12. The wheel 42 is positioned at the front edge of the support platform 9 so as to bear against the underside of a beam 43 extending along the length of the platform 10. The beam 43 supports a rubber strip 44 against which the wheel 42 bears. There is good frictional engagement between the wheel 42 and the strip 44 and thus simply by driving the motor 41 the platform 10 can be driven as appropriate on to and off the support platform 9.

It will be appreciated that in embodiments of the invention, cargo can be loaded onto a platform 10 for subsequent movement up and over the well.

The embodiments described above relate to trailers including wells. It will be readily apparent that the present invention need not be restricted to trailers including wells, but is instead applicable to a wide range of different trailers, and cargo-carrying vehicles in general.

Referring now to FIG. 20, this shows detail of the trailer track 11 engaging the horizontally movable platform 10 in an alternative embodiment. The track 11 comprises an elongate member (or bracket) 110 which is secured to the side wall or panel 28 of the vehicle. Clearly, the side panel 28 must have sufficient strength to support the platform 10 when loaded. To achieve this, the side panel may have a laminated construction, and may include one or more steel sheets for example. The side panels transmit the weight of the loaded platform 10 to the trailer/vehicle chassis. As can be seen in the figure, the elongate track member 110 defines an upwardly facing channel between it and the side wall. This channel receives, in turn, rollers or wheels 33 rotatably mounted on shafts 103 extending transversely from opposite sides of the upper platform 10. The channels (which are provided by track members on opposite sides of the trailer interior walls) thus guide and laterally constrain the rollers as the upper load-bearing platform 10 is driven forward from the elevated support platform. In this example, the weight of the loaded upper platform is sufficient to keep the rollers seated in their wall-mounted tracks. To increase the usable area of the load carrying upper surface 100 of the platform 10, the platform includes extensions 101 extending laterally along each side of the platform, and which cover the roller 33 and axle 103 arrangement. In addition to providing increased area, this arrangement also improves safety. The underside of the upper platform 10 is labelled 104.

FIG. 21 illustrates another track and roller arrangement, suitable for use in embodiments of the invention. Again, an elongate track member 110 is secured to the trailer side wall 28 to define a channel. However, an additional track member is secured to the wall above the first, to define a channel able to receive (by longitudinal insertion) the array of rollers 33 on sides of the upper platform 10. The shafts 103 of the rollers 33 extend through the gap between the two track members, but the rollers are vertically constrained in the defined channel or slot. The arrangement is such that only longitudinal movement of the platform 10 is permitted (i.e. along the trailer's length), and the upper track member prevents the upper platform 10 from being vertically dislodged, even if it is not carrying a load.

FIG. 22 illustrates an alternative drive arrangement for driving the upper platform 10 forward from the support platform 9 in embodiments of the invention. Here, attached to an underside of the upper platform 10, is a rack 105. A drive motor 41 is housed in, and carried by the lower platform 9, and drives a pinion 46 which engages the rack 105. Thus, control of the motor controls forward and reverse motion of the upper platform in the horizontal direction (indicated by arrow H). The motor and pinion are located proximate the forward end 191 of the support platform 9.

FIG. 23 is a highly schematic view of components of another embodiment. The underside 104 of the load platform 10 is shown, and carries a rack 105 along its centre line. A motor 41 has a shaft 45 carrying a pinion, which engages the rack. Thus, the motor (which is attached to the lower support platform, by means not shown) drives the platform at a central position. In such examples, suitable engagement between the upper platform and tracks in the trailer/vehicle side walls may be sufficient to prevent crabbing (i.e. slew of the load platform as it is driven forwards).

FIG. 24 illustrates components of an embodiment similar to that shown in FIG. 23. However, in this example, the upper platform has two parallel racks 105 running along its underside 104, and the drive motor 41 drives a gearbox 450 via its shaft 45. The gearbox has two output shafts 47, on which are driven two pinions 46, each engaging with a respective one of the racks. Thus, a parallel drive is applied to the upper platform, and any tendency for it to slew is reduced.

FIGS. 25 to 30 depict the loading of another trailer embodying the invention. This trailer 1 includes a central well 4, in which a single moveable load-bearing platform is located, together with its actuating mechanism. At the rear of the trailer there is a support platform 9, its actuating mechanism, and an upper platform 10. Before loading commences, the well platform 5 is brought to its raised position, such that its upper surface is level with the trailer floor in the forward part of the trailer. The upper 10 and support platforms are arranged such that the upper platform surface is also level with the well platform upper surface (see FIG. 25). Next, a plurality of cargo units 21 (which may be pallets, boxes, crates, roll cages etc.) are loaded into the trailer, substantially filling the available floor space (see FIG. 26). It should be noted that, in the rear portion of the trailer, stop mechanisms 91 are provided, which are operable to stop the support platform at a slightly elevated position. At this stage of the loading, however, the stops are not actuated, and the support platform rests in its lowered position. Then, as shown in FIG. 27, the well platform 5 is lowered and the support platform 9 is raised, to bring the upper loaded platform 10 into alignment with tracks 11 provided on or in the side walls of the trailer. The upper platform, carrying cargo, is then driven/urged forward by suitable means and is received by, and engages, the track 11. The track is adapted to limit the forward movement of the upper platform. It may also be provided with a stop mechanism, operable when the platform 10 is in its fully forward position to prevent the platform from sliding back along the track. Thus, the upper platform may be locked in place. Even when the upper platform is fully forward, there is a degree of overlap between the upper and support platforms. This is necessary for the longitudinal drive mechanism to be operated in reverse, during the unloading procedure, to "pull" the upper platform 10 out of the tracks 11. In FIG. 28, with the support platform fully elevated, the stops 91 have been actuated. From the position shown in FIG. 28, the support platform 9 is vertically lowered, and this brings about disengagement of the drive mechanism from the upper platform. The support platform 9 then comes to rest at a slightly elevated position (compared with its original loading position), sitting on the array of stops 91 (see FIG. 29). Lastly, a further quantity of cargo 23 is loaded onto the support platform 9, as shown in FIG. 30.

FIGS. 31 to 34 show the lifting mechanism for the support platform of the embodiment from FIGS. 25 to 30 in more detail. The support platform 9 is lifted by an arrangement comprising first and second pneumatically actuated scissor lifts (which may also be referred to as scissor jacks) and an air-bag (or pneumatic jack) arranged between them. The arrangement is shown in the collapsed state in FIG. 31, and in the raised, elevated state in FIG. 32 (in which the upper platform is brought into alignment with the side wall supports/tracks so that it can be driven forwards, over the well 4). As can be seen from FIG. 31, the advantage of the scissor lift arrangement is that it can collapse to a very flat configuration, and so takes up a small volume in the trailer/vehicle. Looking at FIG. 32, the two scissor lift assemblies are spaced apart along the length of the trailer/vehicle. Their construction and operation are the same, so only the forward lift will be described in detail. The forward lift comprises a first beam 921 connected to a second beam 922 by a pivot 93. Third and fourth beams are located behind the first and second in the figure, spaced apart across the trailer width. A first end of the first beam 921 is hingedly attached to an anchor point 94 which in turn is rigidly attached to a base plate 940 secured to the trailer chassis. The opposite end of beam 921 carries a roller 96 which engages an underside surface of the support platform 9. The second beam 922 is hingedly coupled at a one end to an anchor 95 attached to the underside of the support platform 9, and the opposite end carries another roller which is free to roll over a flat roller plate 97 attached to the chassis. The crossed beams 921, 922 thus form a scissor arrangement, and this is actuated by a pair of airbags 99 which are arranged to expand in a generally segmental form. These airbags are in contact with plates (not shown) attached between the scissor beams. Initially (i.e. in the collapsed state) the air bags 99 are deflated. Then, to raise the platform 9 the bags are inflated, causing the scissor to expand (i.e. the beams pivot, the rollers roll across the plate 97 and platform 9 surfaces). A further lifting force is provided by the central air bag/jack 98 which is inflated at the same time.

Figure 33:
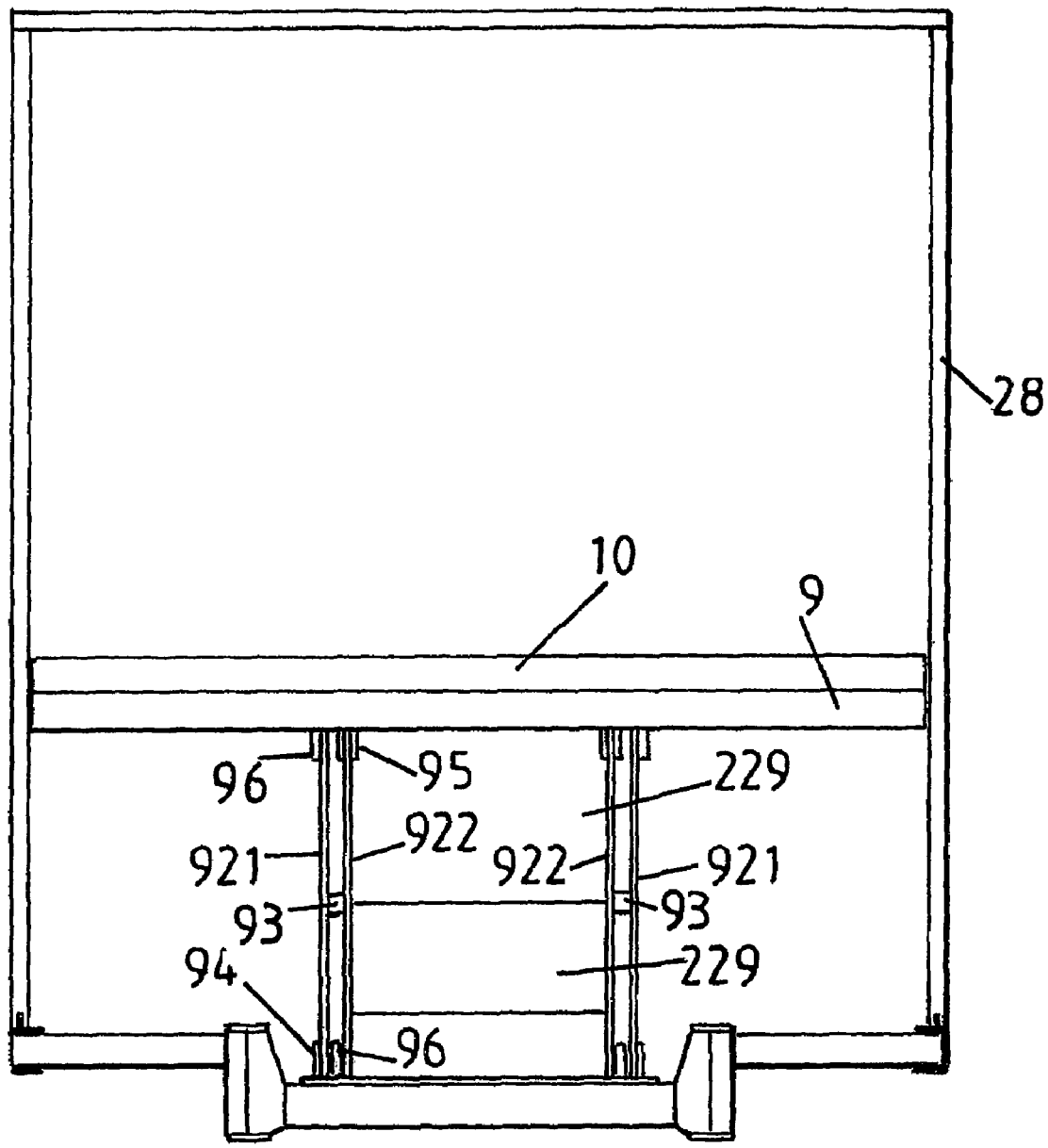
FIG. 33 is a rear view of the elevated assembly of FIG. 32.
Figure 34:
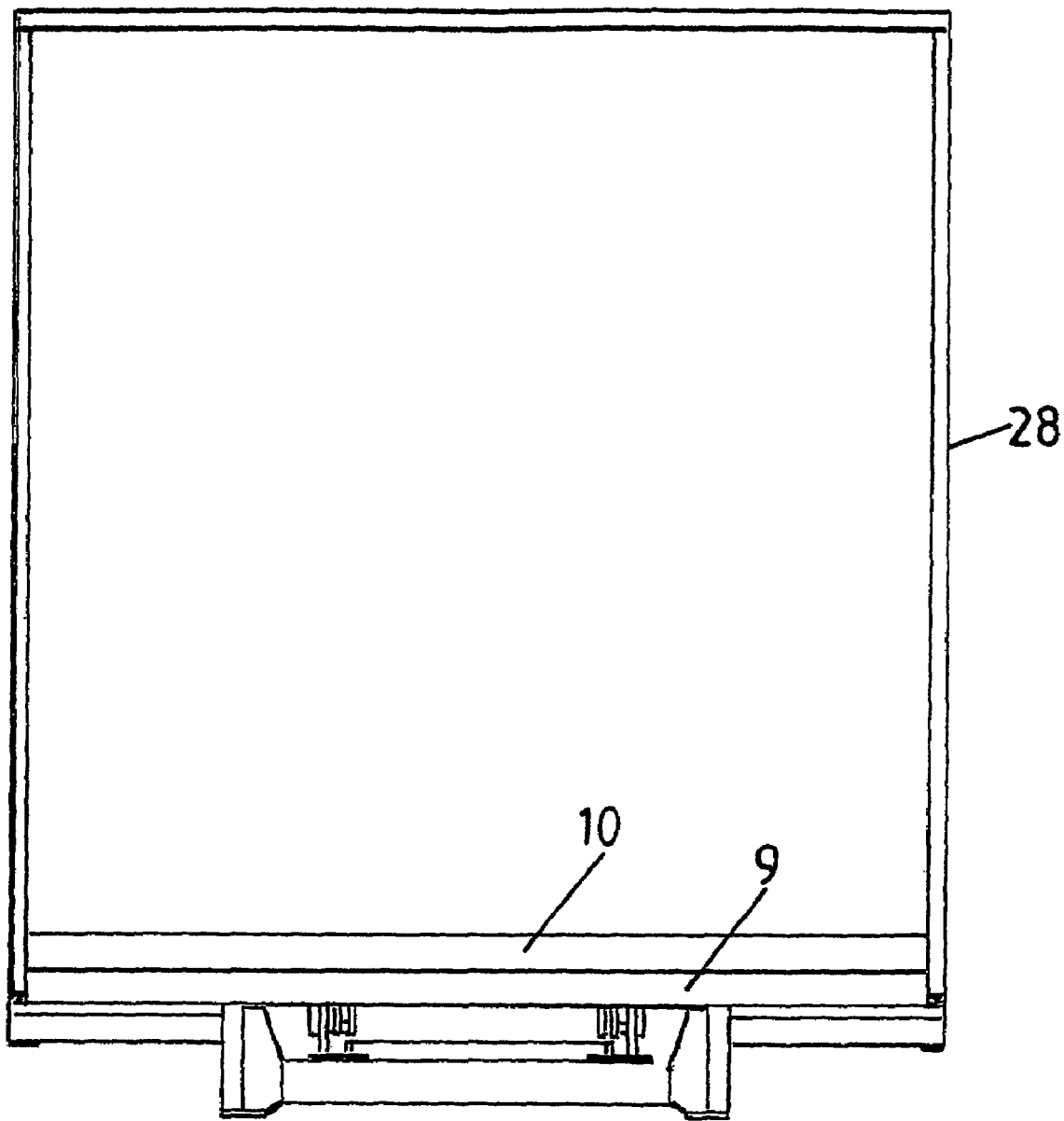
FIG. 34 is a rear view of the lowered assembly of FIG. 31.

FIG. 33 shows the elevated scissor arrangement from the rear of the trailer. The opposing pairs of pivotally coupled beams 921, 922 on either side of the trailer centre line can be seen, as can the plates 229, against which the air bags 99 exert a force to expand the scissor arrangement. FIG. 34 shows the collapsed state, from the rear.

Although the above example employed pneumatically actuated scissor lifts, it will be apparent that scissor lifts actuated by different means may be used in embodiments of the invention. For example, hydraulic actuators or screw mechanisms (screw jacks) may be used. With the pneumatic systems, it will be apparent that the trailer or vehicle may conveniently be provided with a compressor and a compressed air storage vessel for inflating the air bags/air jacks.

FIGS. 35 and 36 illustrate an alternative stop arrangement for use in embodiments of the invention to limit the downward movement of the support platform when it is lowered after depositing the upper platform in its forward, raised position. The stop comprises a housing 911 and a stop member 91 arranged to rotate about a pivot 910. The pivot 910 is arranged above the centre of gravity of the stop member 91, which accordingly tends to adopt the position shown in FIG. 35 under gravity. A front lower wall 961 of the housing prevents the lower portion of the stop member 91 from swinging forward out of the housing. Inside the housing is located an airbag 912, or some other suitable actuating device. In FIG. 35, the airbag is deflated, the stop member is inside the housing, and the side edge of the support platform 9 is free to move up past the stop assembly. Then, the airbag can be inflated, as shown in FIG. 36. This exerts a moment on the stop member, causing it to rotate about the pivot 910. This rotation is limited by the lower end of the stop member 91 abutting the rear inner wall of the housing, and in this position an upper end surface 913 of the stop member is generally horizontal and extends out from the housing 911. As the platform 9 is lowered, it engages the protruding upper surface of the stop member, and rests on it. The weight of the platform keeps the stop in the position shown in FIG. 36, even if the airbag fails.

Figure 32:
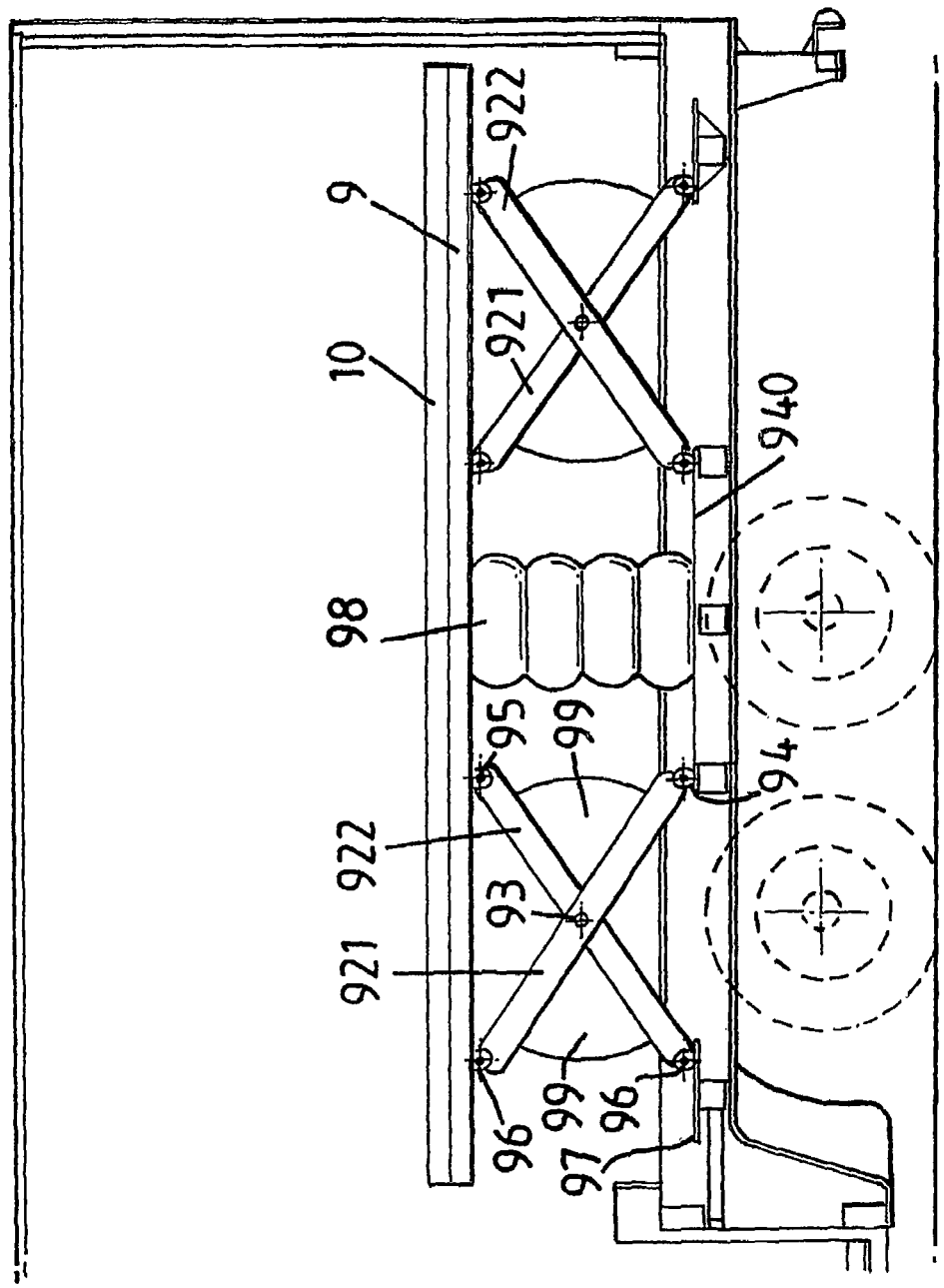
FIG. 32 is a side view of the assembly of FIG. 31, but in an elevated position.

FIG. 37 shows part of a vehicle embodying the invention, the vehicle including a well 4 with a single load-carrying platform 5 in it. The platform 5 can be moved up and down within the well by means of a scissor lift mechanism, broadly the same in operation to that described above with reference to FIGS. 31-34. The mechanism comprises three scissor-jack assemblies 92a, 92b, 92c, spaced apart along the well's length. As can be seen from FIG. 37, in this example, two upper platform supports 11A and 11B are secured to the sidewalls, at two different predetermined heights. A rear support platform and horizontal drive can thus be operated to select the supports onto which the rear load carrying platform is placed. FIG. 38 shows a cross section of the vehicle, along line A-A from FIG. 37. Only part of one scissor mechanism is therefore shown. The crossed scissor members 921, 922 can be seen, anchored at one end to hinged supports 94, 95, and carrying rollers 96 at the other end. Thus, the platform 5 is hingedly coupled at one side to the scissor mechanisms, and at the other side is simply resting on the rollers 96. As seen in FIG. 32, the crossed scissor members 921, 922 pivot at 93. To facilitate maintenance, a hoist anchor point 50 is provided on the vehicle ceiling, above the side of the platform resting on the rollers. By suitable connection 51 the platform can simply be lifted, such that it rotates in the direction indicated by arrow 52, thereby permitting access to the volume beneath it in the well (and hence facilitating maintenance and cleaning of the well and well-lift assembly). The supports 11A and 11B are in the form of shelf members extending transversely into the vehicle cargo space from the side walls. The upper platform can be slid onto the shelves, or may comprise an array of rollers arranged to rest on and roll along the upper surfaces of the shelf supports 11A and 11B.

Figure 39:
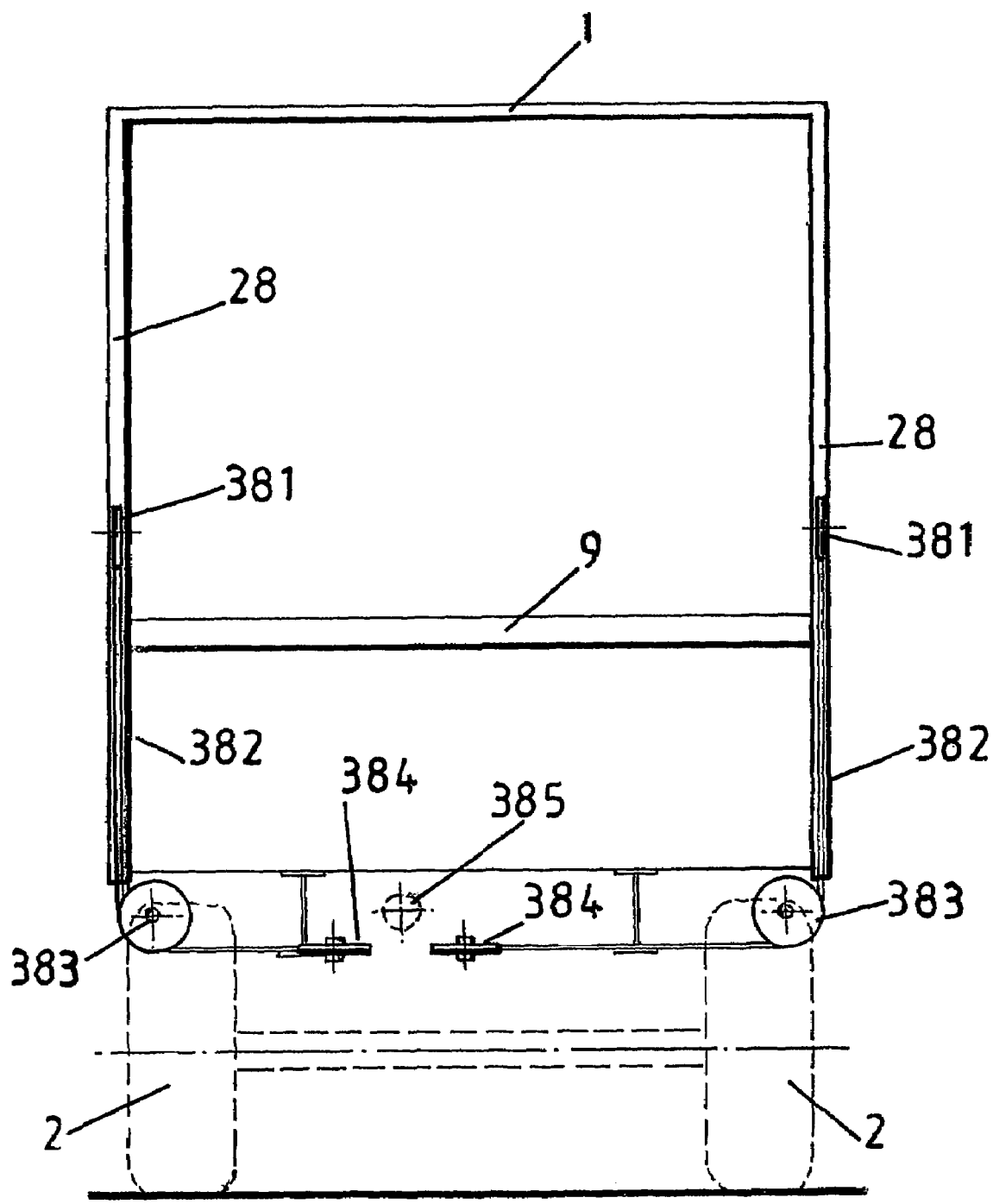
FIG. 39 is a schematic rear view of the lifting mechanism for a vertical lift platform used in a trailer embodying the invention.
Figure 40:
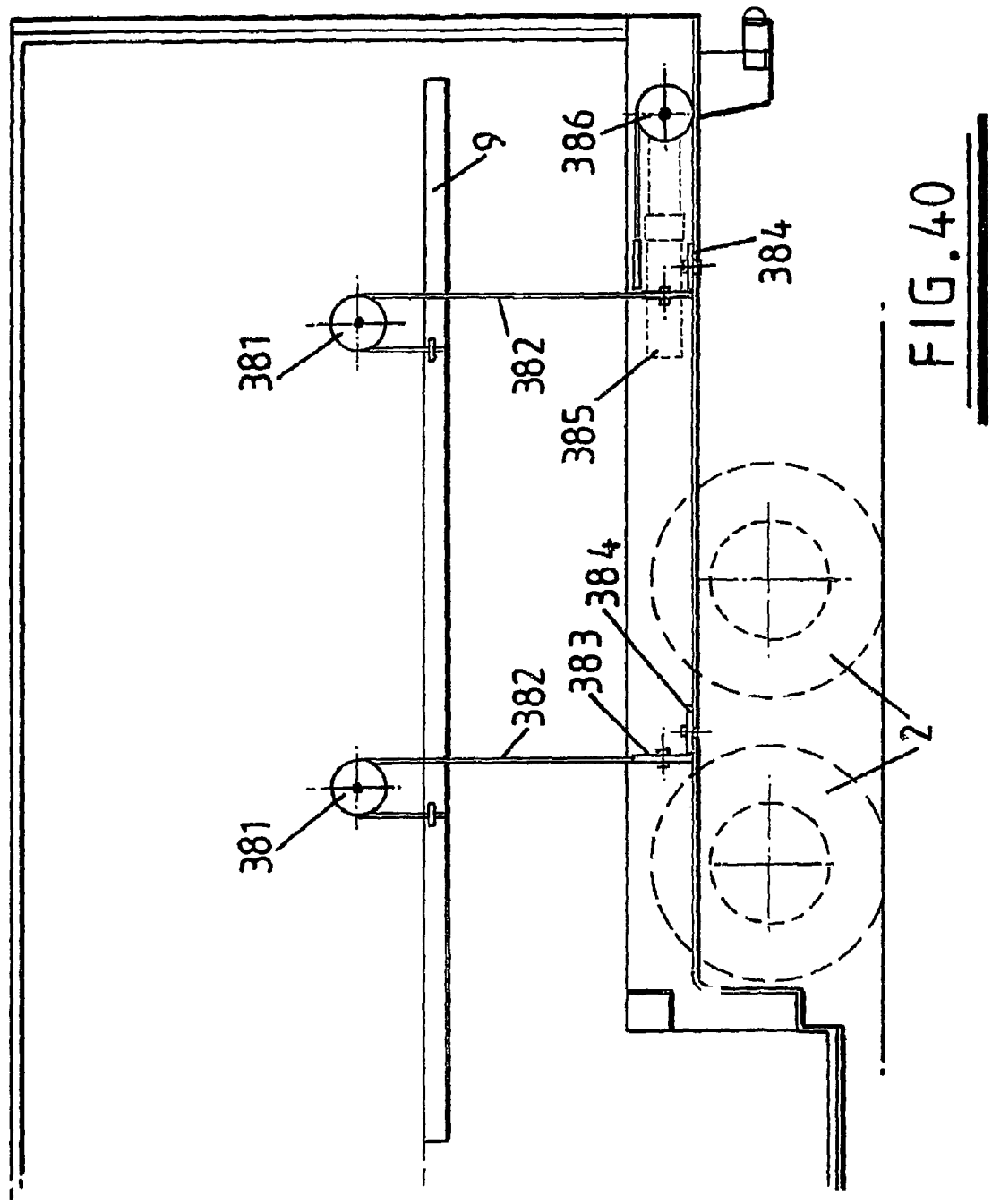
FIG. 40 is a schematic side view of the lifting mechanism of FIG. 39.

Referring now to FIGS. 39 to 41, these show alternative mechanisms for lifting the support platform in embodiments of the invention. The support platform is connected to cables 382 which run over an array of pulleys to a single hydraulic ram. These pulleys include high level pulleys 381 located in the trailer walls 28, low level vertical pulleys 383 (i.e. arranged to rotate about horizontal axes), low level horizontal pulleys 384 (i.e. arranged to rotate about vertical axes), and pulleys 386 driven (i.e. translated) by the ram. To raise the platform 9 the ram is extended, so pulling the cables over the pulley arrangement and lifting the platform at 4 points, 2 on either side of the trailer, to keep the platform level.

The invention claimed is:

1. A trailer defining a floor having a floor level extending from a first end of the trailer, and comprising
   a first displaceable platform onto which goods are to be loaded from the first end of the trailer, the first displaceable platform having an upper surface onto which goods are to be loaded,
   a vertically displaceable platform, the vertically displaceable platform having an upper surface for carrying the first displaceable platform,
   a lifting mechanism arranged to displace the vertically displaceable platform vertically,
   the trailer having
      an initial loading condition in which the upper surface of the first displaceable platform is arranged at said floor level of the trailer,
      a first platform lift condition in which the lifting mechanism displaces the vertically displaceable platform to an elevated position above said floor level so as to lift said first displaceable platform, the first displaceable platform being displaceable away from the first end of the trailer after the vertically displaceable platform has been displaced to said elevated position, and
      a subsequent loading condition in which the upper surface of the vertically displaceable platform is arranged at said floor level of the trailer to enable goods to be loaded onto the vertically displaceable platform after the first displaceable platform has been elevated and displaced away from the first end of the trailer.

2. A trailer in accordance with claim 1, comprising a lifting mechanism arranged to vertically displace the vertically displaceable platform.

3. A trailer in accordance with claim 2, wherein the lifting mechanism comprises at least one scissor lift.

4. A trailer in accordance with claim 3, wherein the lifting mechanism comprises two pneumatically actuated scissor lifts spaced apart in a longitudinal direction and a pneumatic jack arranged between them.

5. A trailer in accordance with claim 2, wherein the lifting mechanism comprises at least one pneumatic actuator.

6. A trailer in accordance with claim 2, wherein the lifting mechanism comprises at least one pulley and at least one pulley chord.

7. A trailer in accordance with claim 1, wherein the lifting mechanism is arranged to maintain the vertically displaceable platform substantially parallel to the trailer floor.

8. A trailer in accordance with claim 1, wherein vertical movement of the further displaceable platform is effected by hydraulic rams.

9. A trailer in accordance with claim 1, wherein vertical movement of the vertically displaceable platform is effected by screw jacks.

10. A trailer according to claim 1, wherein the trailer further comprises at least one second displaceable platform which can be displaced from a first upper position to a second lower position within the well, wherein the first platform is arranged to be elevated and advanced forwards such that at least a part of the first platform is directly above the well.

11. A trailer in accordance with claim 1, comprising means for elevating and advancing the first displaceable platform, when loaded, to at least one elevated forward position in the trailer, the trailer further comprising supports mounted on sidewalls of the trailer, said supports being arranged to support the first displaceable platform in the elevated forward position.

12. A trailer in accordance with claim 11, wherein the first displaceable platform is substantially parallel to the trailer floor when in said elevated forward position.

13. A trailer in accordance with claim 12, wherein said supports comprise at least one pair of tracks mounted on opposite sidewalls of the trailer.

14. A trailer in accordance with claim 13, wherein said tracks are arranged substantially parallel to the trailer floor.

15. A trailer in accordance with claim 13, wherein the first displaceable platform comprises a plurality of rollers, and said tracks provide rolling surfaces for said rollers such that the first displaceable platform may be elevated and then driven forwards such that it rolls onto the supports, to the elevated forward position.

16. A trailer in accordance with claim 15, wherein each track defines a channel for receiving said rollers.

17. A trailer in accordance with claim 13, wherein the tracks further comprise end stops arranged to limit forward movement of the first displaceable platform.

18. A trailer in accordance with claim 13, further comprising controllable stops operable to lock the first displaceable platform in the forward elevated position.

19. A trailer according to claim 1, wherein the first displaceable platform can be advanced forwards only from a predetermined vertical position.

20. A trailer according to claim 19, wherein the predetermined vertical position is defined by tracks provided in walls of the trailer, said tracks being fixedly located in the predetermined vertical position, and the first displaceable platform can be advanced forward along said tracks.

21. A trailer in accordance with claim 1, wherein the first displaceable platform is a load-carrying platform, the trailer comprising a first section defining a load-carrying front floor, a rear section defining a rear floor, a well section located between the front and rear sections, and means for lowering payload into the well section, wherein a further vertically spaced is vertically displaceable above the rear floor between raised and lowered positions, and the vertically displaceable platform carries the load-carrying platform which is horizontally displaceable over the well when the vertically displaceable platform is in the raised position, the load-carrying platform being displaceable from the vertically displaceable platform onto supports mounted on sidewalls of the vehicle.

22. A trailer in accordance with claim 21, wherein rollers are interposed between the vertically displaceable platform and load-carrying platform.

23. A vehicle according to claim 22, wherein the load-carrying platform supports rollers along its longitudinal edges which run on tracks extending along longitudinal edges of the vertically displaceable platform.

24. A trailer in accordance with claim 21, wherein rollers are interposed between the sidewall supports and the load-carrying platform.

25. A trailer according to claim 24, wherein the sidewall supports include rollers on which formations on the longitudinal edges of the load-carrying platform roll.

26. A trailer according to claim 25, wherein the sidewall support rollers are mounted on plates defining inner sidewalls of the well section.

27. A trailer according to claim 21, wherein the support platform carries a drive motor for displacing the load-carrying platform over the well.

28. A trailer according to claim 27, wherein the drive motor drives a roller which rotates about an axis transverse to the trailer, which projects above an upper surface of the vertically displaceable platform, and which frictionally engages a surface defined by the load carrying platform such that rotation of the roller drives the load-carrying platform relative to the vertically displaceable platform.

29. A trailer in accordance with claim 27, wherein the load carrying platform comprises a rack and the drive motor is arranged to drive a pinion which engages the rack.

30. A trailer in accordance with claim 1, wherein the vertically displaceable platform carries a drive motor, operable to drive the first displaceable platform forward, away from the first end of the trailer, after the vertically displaceable platform has been displaced to an upper position.

31. A trailer in accordance with claim 30, wherein the drive motor is arranged to drive a pinion engaged with a rack provided on the first displaceable platform.

32. A trailer comprising
a closed front end and an open rear end, which can be closed off by means of a door,
a forward cargo section adjacent the front end having a fixed floor level,
an intermediate cargo section comprising a well having a floor level below fixed floor level and a well deck arranged in the well, the well deck having an upper surface, with a well deck lifting mechanism in the well to effect one of lifting and lowering of the well deck, and
a rear cargo section adjacent the rear end and comprising
a first displaceable platform having an upper surface onto which goods can be loaded, and a vertically displaceable platform having an upper surface onto which goods can be loaded, the upper surface being adapted for carrying the first displaceable platform, and a rear platform lifting mechanism, the forward, intermediate and rear cargo sections being adapted to provide a floor having a common floor level whereby goods can be loaded from the open rear end to the forward cargo section, traversing the floor, a displacing mechanism for displacing the first displaceable platform towards and/or away from the front end of the trailer, the trailer having a first loading condition in which the upper surface of the well deck and the first displaceable platform are configured to lie at the common floor level whereby goods to be loaded into the trailer transverse the rear and intermediate cargo sections for loading into the forward cargo section, the intermediate cargo section and the rear cargo section, a rear platform elevation condition in which the rear platform lifting mechanism elevates the vertically displaceable platform and the first displaceable platform to an elevated position whereby the displacing mechanism displaces the first displaceable platform towards the front end of the trailer and a subsequent loading condition in which the vertically displaceable platform is configured so that its upper surface lies at the common floor level.

33. A trailer in accordance with claim 32, wherein the first platform is movable to an elevated forward position in which the first platform completely covers the well.

34. A trailer in accordance with claim 32, comprising a second lifting mechanism arranged to vertically displace the second displaceable platform.

35. A trailer in accordance with claim 34, wherein the second lifting mechanism is arranged to maintain the second displaceable platform substantially parallel to the trailer floor.

36. A trailer in accordance with claim 34, wherein the second lifting mechanism comprises at least one scissor lift.

37. A trailer in accordance with claim 34, wherein the second lifting mechanism comprises at least one pneumatic actuator.

38. A trailer in accordance with claim 34, wherein the second lifting mechanism comprises at least one hydraulic actuator.

39. A trailer in accordance with claim 34, wherein the second lifting mechanism comprises at least one screw jack.

* * * * *